US011952801B2

(12) United States Patent
Snodgrass et al.

(10) Patent No.: US 11,952,801 B2
(45) Date of Patent: Apr. 9, 2024

(54) ELECTRO-MECHANICAL LOCK CORE WITH A CAM MEMBER TAILPIECE

(71) Applicant: dormakaba USA Inc., Indianapolis, IN (US)

(72) Inventors: John Andrew Snodgrass, Indianapolis, IN (US); Brendon Allen, Indianapolis, IN (US); Street Anthony Barnett, III, Indianapolis, IN (US); Chad Hickman, Rensselaer, IN (US)

(73) Assignee: dormakaba USA, Inc, Indianapolis, IN (US)

( * ) Notice: Subject to any disclaimer, the term of this patent is extended or adjusted under 35 U.S.C. 154(b) by 218 days.

(21) Appl. No.: 17/494,727

(22) Filed: Oct. 5, 2021

(65) Prior Publication Data

US 2022/0025676 A1 Jan. 27, 2022

Related U.S. Application Data

(63) Continuation-in-part of application No. 17/419,665, filed as application No. PCT/US2020/025961 on Mar. 31, 2020, now abandoned.

(Continued)

(51) Int. Cl.

*E05B 47/00* (2006.01)
*E05B 9/08* (2006.01)

(Continued)

(52) U.S. Cl.

CPC .......... *E05B 47/0012* (2013.01); *E05B 9/086* (2013.01); *E05B 15/006* (2013.01); *E05B 47/0642* (2013.01); *E05B 2047/0026* (2013.01)

(58) Field of Classification Search

CPC ..... E05B 2047/0026; E05B 2047/0027; E05B 2047/003; E05B 2047/0031;

(Continued)

(56) References Cited

U.S. PATENT DOCUMENTS

| | | | |
|---|---|---|---|
| 2,677,261 | A | 5/1954 | Jacobi |
| 3,785,183 | A | 1/1974 | Sander |

(Continued)

FOREIGN PATENT DOCUMENTS

| | | | |
|---|---|---|---|
| CN | 206487252 | U | 9/2017 |
| CN | 208294271 | U | 12/2018 |

(Continued)

OTHER PUBLICATIONS

International Search Report and Written Opinion issued in PCT/US2020/025961, dated Jun. 26, 2020, 12 pages.

(Continued)

*Primary Examiner* — Alyson M Merlino

(74) *Attorney, Agent, or Firm* — Faegre Drinker Biddle & Reath LLP

(57) ABSTRACT

A removable lock core for use with a lock device having a locked state and an unlocked state is disclosed. The removeable lock core may include a cam member tailpiece which is moveable between a first position relative to a lock core body which corresponds to the lock device being in the locked state and a second position relative to a lock core body which permits removal of the removeable lock core from the lock device which corresponds to the lock device being in the unlocked state. The removeable lock core may include an electro-mechanical drive assembly which in a disengaged state is decoupled from the cam member tailpiece and in an engaged state is coupled to the cam member tailpiece. A cam lock having a locked state and an unlocked state for use with a catch is disclosed.

16 Claims, 23 Drawing Sheets

Related U.S. Application Data

(60) Provisional application No. 62/829,768, filed on Apr. 5, 2019.

(51) Int. Cl.
*E05B 15/00* (2006.01)
*E05B 47/06* (2006.01)

(58) Field of Classification Search
CPC ..... E05B 2047/0032; E05B 2047/0016; E05B 47/06; E05B 47/0611; E05B 47/0615; E05B 47/0638; E05B 47/0642; E05B 47/0646; E05B 47/0649; E05B 47/0676; E05B 47/068; E05B 47/0684; E05B 47/0688; E05B 15/0053; E05B 15/006; E05B 15/008
See application file for complete search history.

(56) References Cited

U.S. PATENT DOCUMENTS

| | | | | |
|---|---|---|---|---|
| 3,820,283 | A | 6/1974 | Acerra et al. | |
| 4,345,448 | A | 8/1982 | Solomon | |
| 4,484,462 | A | 11/1984 | Berkowitz | |
| 4,921,033 | A | 5/1990 | Finch et al. | |
| 5,121,618 | A * | 6/1992 | Scott | E05B 9/084 70/386 |
| 5,172,574 | A | 12/1992 | Perfetto | |
| 5,404,734 | A | 4/1995 | Martinez | |
| 6,338,261 | B1 | 1/2002 | Liu | |
| 6,615,625 | B2 | 9/2003 | Davis | |
| 6,826,935 | B2 | 12/2004 | Gokcebay et al. | |
| 6,915,670 | B2 | 7/2005 | Gogel | |
| 7,047,774 | B1 | 5/2006 | Gogel | |
| 7,918,115 | B2 | 4/2011 | Fredriksson et al. | |
| 8,596,330 | B2 | 12/2013 | Slusarski et al. | |
| 8,789,859 | B2 | 7/2014 | Curtis et al. | |
| 8,919,156 | B1 | 12/2014 | Liu | |
| 8,978,426 | B2 | 3/2015 | Wang | |
| 9,388,604 | B2 | 7/2016 | Ferreira Sanchez et al. | |
| 2001/0005998 | A1 | 7/2001 | Imedio Ocana | |
| 2004/0107751 | A1 | 6/2004 | Hyatt | |
| 2004/0207214 | A1 * | 10/2004 | Lin | E05B 47/0012 292/336.3 |
| 2004/0255627 | A1 | 12/2004 | Shimon | |
| 2005/0252257 | A1 | 11/2005 | Woods et al. | |
| 2008/0072636 | A1 | 3/2008 | Padilla et al. | |
| 2008/0078220 | A1 * | 4/2008 | Kim | E05B 47/0642 70/283.1 |
| 2008/0180211 | A1 * | 7/2008 | Lien | E05B 47/068 340/5.61 |
| 2009/0211319 | A1 | 8/2009 | McCormack | |
| 2013/0014552 | A1 | 1/2013 | Bench et al. | |
| 2014/0165673 | A1 * | 6/2014 | Tyner | E05B 47/068 70/141 |
| 2014/0260456 | A1 | 9/2014 | Dewalch et al. | |
| 2016/0017639 | A1 | 1/2016 | Binek et al. | |
| 2017/0247914 | A1 | 8/2017 | Waugh et al. | |
| 2017/0306652 | A1 | 10/2017 | Guo et al. | |
| 2022/0195754 | A1 * | 6/2022 | Chen | E05B 47/068 |

FOREIGN PATENT DOCUMENTS

| | | | |
|---|---|---|---|
| EP | 0957219 | A1 | 11/1999 |
| EP | 1065340 | A2 | 1/2001 |
| EP | 1903169 | A2 | 3/2008 |
| EP | 2921621 | B1 | 1/2018 |
| WO | 2019/051337 | A1 | 3/2019 |

OTHER PUBLICATIONS

International Preliminary Report on Patentability received for PCT Patent Application No. PCT/US2020/025961, dated Oct. 14, 2021, 9 pages.

International Search Report and Written Opinion received for PCT Patent Application No. PCT/US2020/025961, dated Jun. 26, 2020, 4 pages.

* cited by examiner

ELECTRO-MECHANICAL LOCK CORE WITH A CAM MEMBER TAILPIECE

CROSS-REFERENCE TO RELATED APPLICATIONS

This application is a continuation-in-part of U.S. patent application Ser. No. 17/419,665, titled ELECTRO-MECHANICAL LOCK CORE WITH A CAM MEMBER TAILPIECE, filed Jun. 29, 2021, which is a 371 national phase of PCT Application No. PCT/US2020/025961 filed Mar. 31, 2020, titled ELECTRO-MECHANICAL LOCK CORE WITH A CAM MEMBER TAILPIECE, which claims the benefit of U.S. Provisional Patent Application No. 62/829,768, filed Apr. 5, 2019, titled ELECTRO-MECHANICAL LOCK CORE WITH A CAM MEMBER TAIL PIECE, the entire disclosures of which are expressly incorporated by reference herein.

This application is related to U.S. Provisional Application No. 62/833,314, filed Apr. 12, 2019, titled ELECTRO-MECHANICAL LOCK CORE; PCT Application No. PCT/US19/27220 filed Apr. 12, 2019; U.S. Design application No. 29/686,585, filed Apr. 5, 2019, titled KNOB, U.S. Provisional Application No. 62/829,778, filed Apr. 5, 2019, titled ELECTRO-MECHANICAL STORAGE DOOR LOCK, and U.S. Provisional Application No. 62/872,121, filed Jul. 9, 2019, titled ELECTRONIC LOCK, the entire disclosures of which are expressly incorporated by reference herein.

FIELD

The present disclosure relates to lock cores and in particular to lock cores having an electro-mechanical locking system.

BACKGROUND

In one application, storage lockers with rollup doors are often secured using small mechanical lock cores which are operated by a key. When the key is rotated, it brings a cam into alignment to permit removal of the entire core from the lock. Thus, it is the body of the core itself which blocks movement of the bolt. This design, though simple and cost-effective, suffers from the limitations inherent to a purely mechanical system.

In another application, improvements in traditional cam locks, such as for cabinets, drawers, and other applications, wherein a cam tailpiece moves to lock and unlock are needed.

SUMMARY

A removable lock core for use with a lock device having a locked state and an unlocked state is disclosed. The removeable lock core may include a cam member tailpiece which is moveable between a first position relative to a lock core body which corresponds to the lock device being in the locked state and a second position relative to a lock core body which permits removal of the removeable lock core from the lock device which corresponds to the lock device being in the unlocked state. The removeable lock core may include an electro-mechanical drive assembly which in a disengaged state is decoupled from the cam member tailpiece and in an engaged state is coupled to the cam member tailpiece. A cam lock having a locked state and an unlocked state for use with a catch is disclosed.

The disclosure, in one form thereof, provides a cam lock for use with a catch is provided. The cam lock includes a lock body and a drive member supported by the lock body and rotatable relative to the lock body about a longitudinal axis. The cam lock includes a cam member tailpiece coupled to the drive member and rotatable by the drive member, the cam member tailpiece having a first end coupled to the drive member and a second end opposite the first end, the first end being positionable by the drive member in a first cam member tailpiece position adapted to be in line with the catch and a second cam member tailpiece position adapted to be unaligned with the catch. The cam lock includes an electro-mechanical drive assembly including a clutch moveable between a first clutch position where the clutch is operatively disengaged from the drive member and a second clutch position wherein the clutch is operatively engaged to the drive member. The cam lock includes an indexer which assists in holding the cam member tailpiece in the first cam member tailpiece position when the clutch is in the first clutch position.

In examples thereof, the indexer further assists in holding the cam member tailpiece in the second cam member tailpiece position.

In examples thereof, the indexer is positioned within an interior of the lock core body.

In examples thereof, the indexer includes a first collar secured to the drive member to rotate with the drive member and a second collar which does not rotate with the drive member, wherein the drive member passes through each of the first collar and the second collar, and wherein each of the first collar and the second collar include a series of interactive protrusions and recesses, a first protrusion of the first collar being received in a first recess of the second collar when the cam member tailpiece is in the first cam member tailpiece position and the first protrusion of the first collar being received in a second recess of the second collar when the cam member tailpiece is in the second cam member tailpiece position.

In examples thereof, the second collar is translatable along the longitudinal axis relative to the first collar and further comprising a biasing member positioned to bias the second collar into contact with the first collar when the clutch is in the first position.

In examples thereof, the drive member includes a drive member input and a drive member output operatively coupled to the drive member input such that rotation of the drive member input causes rotation of the drive member output.

In examples thereof, the indexer includes a plurality of bearings that are received within an opening of the drive member and are biased to a first position wherein the plurality of bearings extend into a first opening and a second opening of the lock core body.

In examples thereof, the drive member includes a drive member input operatively coupled to a drive member output wherein the drive member input is rotatable relative to the drive member output through a defined angle of rotation.

In examples thereof, the indexer includes at least a first collar and a second collar operatively coupled to the first collar, wherein each of the first collar and the second collar include a protrusion capable of extending into a plurality of openings of the lock core body.

In examples thereof, the electro-mechanical drive assembly further includes an operator actuatable input moveably coupled to the lock body, an electric motor operatively coupled to the clutch to position the clutch in the first clutch position, and a power source operatively coupled to the electric motor.

In examples thereof, the electric motor is operatively coupled to the clutch to position the clutch in the second clutch position wherein the clutch is operatively engaged to the drive member.

In examples thereof, the operator actuatable input is freely rotatable about the longitudinal axis relative to the drive member when the clutch is in the first position and is rotatable about the longitudinal axis only through a defined angular range when the clutch is in the second position, a first end of the defined angular range corresponding to the cam member tailpiece being in the first cam member tailpiece position relative to the lock body and a second end of the defined angular range corresponding to the cam member tailpiece being in the second cam member tailpiece position relative to the lock body.

In examples thereof, the second end of the cam member tailpiece is positioned outside of an exterior envelope of the lock body in both the first cam member tailpiece position and the second cam member tailpiece position.

In a further embodiment thereof, the present disclosure provides an electro-mechanical lock core, including a lock core body having a longitudinal axis and a drive member supported by the lock core body and moveable relative to the lock core body. The electro-mechanical lock core includes a cam member tailpiece operatively coupled to the drive member and rotatable by the drive member, the cam member tailpiece being positionable by the drive member in a first cam member tailpiece position longitudinally in line with the catch and in a second cam member tailpiece position wherein the cam member tailpiece is longitudinally unaligned with the catch and an indexer operatively coupled to the drive member such that rotation of the drive member causes rotation of the indexer. The electro-mechanical lock core includes wherein the indexer includes a first collar and a second collar each comprising a protrusion biased into a first position wherein the protrusions are extendable into a plurality of openings of the lock core body and an electro-mechanical drive assembly including a clutch moveable between a first clutch position wherein the clutch is operatively disengaged from the drive member and a second clutch position wherein the clutch is operatively engaged to the drive member.

In examples thereof, the drive member includes a drive member input operatively coupled to a drive member output, the drive member input being rotatable relative to the drive member output through a defined angular range.

In examples thereof, rotation of the drive member input at an angle that exceeds the defined angular range causes rotation of the drive member output.

In examples thereof, rotation of the drive member output causes the protrusions of the first and second collar to be rotated out of the first position, retracted from the plurality of openings, and rotated into a second position.

In examples thereof, the drive member includes a plurality of bearings biased in a first position wherein the plurality of bearings extend into a plurality of openings of the lock core body to retain the cam member tailpiece in the first cam member position.

In examples thereof, the rotation of the drive member output causes the rotation of the plurality of bearings from the first position to retain the cam member tailpiece in the first cam member position to a second position to retain the cam member tailpiece in the second cam member position.

In yet a further embodiment thereof, the present disclosure provides a method of unlocking a barrier including holding a cam member tailpiece of a removeable lock core in a first cam member tailpiece position wherein a portion of the cam member tailpiece is aligned with a catch of the barrier. The method includes providing an operator actuatable assembly supported by the removeable lock core, a clutch of operator assembly operatively coupled with the cam member tailpiece through a drive member, the clutch having an engaged state wherein an operator actuatable input is operatively coupled with the drive member and a disengaged state wherein the operator actuatable input is not operatively coupled with the drive member, wherein rotation of the operator actuatable input when the clutch is in the engaged state causes rotation of the drive member from a first position to a second position, each of the first position and the second position defined by an orientation of a plurality of bearings, and wherein rotation of the drive member from the first position to the second position causes rotation of the cam member tailpiece from the first cam member tailpiece position to a second cam member tailpiece position wherein the portion of the cam member tailpiece is no longer aligned with the catch of the barrier. The method includes communicating credential information between an electronic controller of the removable lock core and a portable user device to engage the clutch; and rotating the operator actuatable input.

In examples thereof, the method includes wherein when the clutch is engaged, the rotation of the operator actuable input is limited to an angular range for rotation that is defined by the rotation of the drive member from the first position to the second position.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
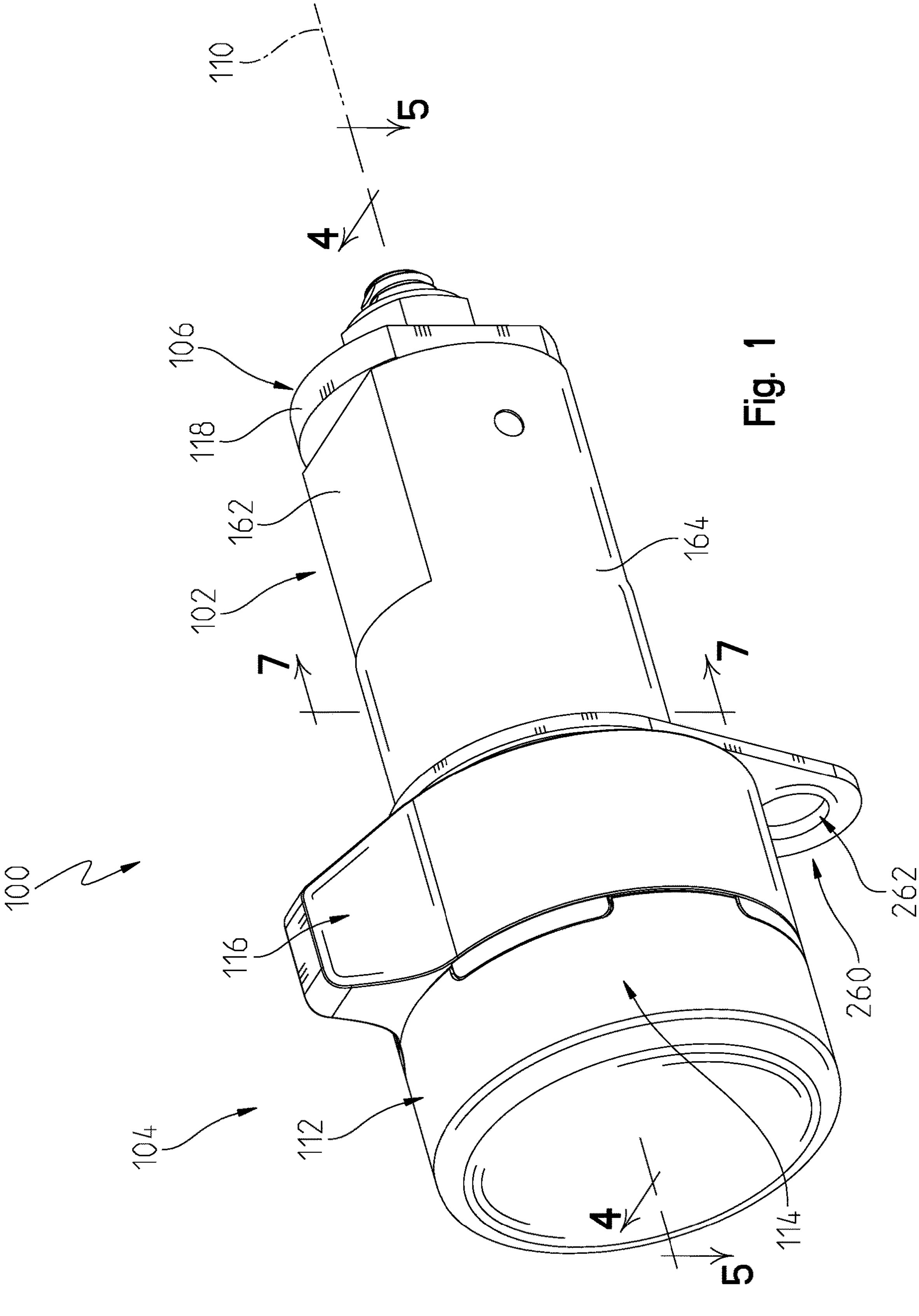
FIG. 1 illustrates a front perspective view of a removeable electro-mechanical lock core with a cam member tailpiece.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIGS. 1-7, an electro-mechanical lock core 100 includes a core assembly 102 and an operator actuation assembly 104. As explained herein in more detail, in certain configurations operator actuation assembly 104 may be actuated to rotate a cam member tailpiece 106 through the rotation of a drive member 108 (see FIG. 3) of core assembly 102 about a longitudinal axis 110.

Operator actuation assembly 104 includes an operator actuation input 112 which includes a generally cylindrical knob 114 and a thumb tab 116. Further, although operator actuation assembly 104 is illustrated as including a generally cylindrical knob and thumb tab, other user actuatable input devices may be used including handles, levers, and other suitable devices for interaction with an operator.

Figure 4:
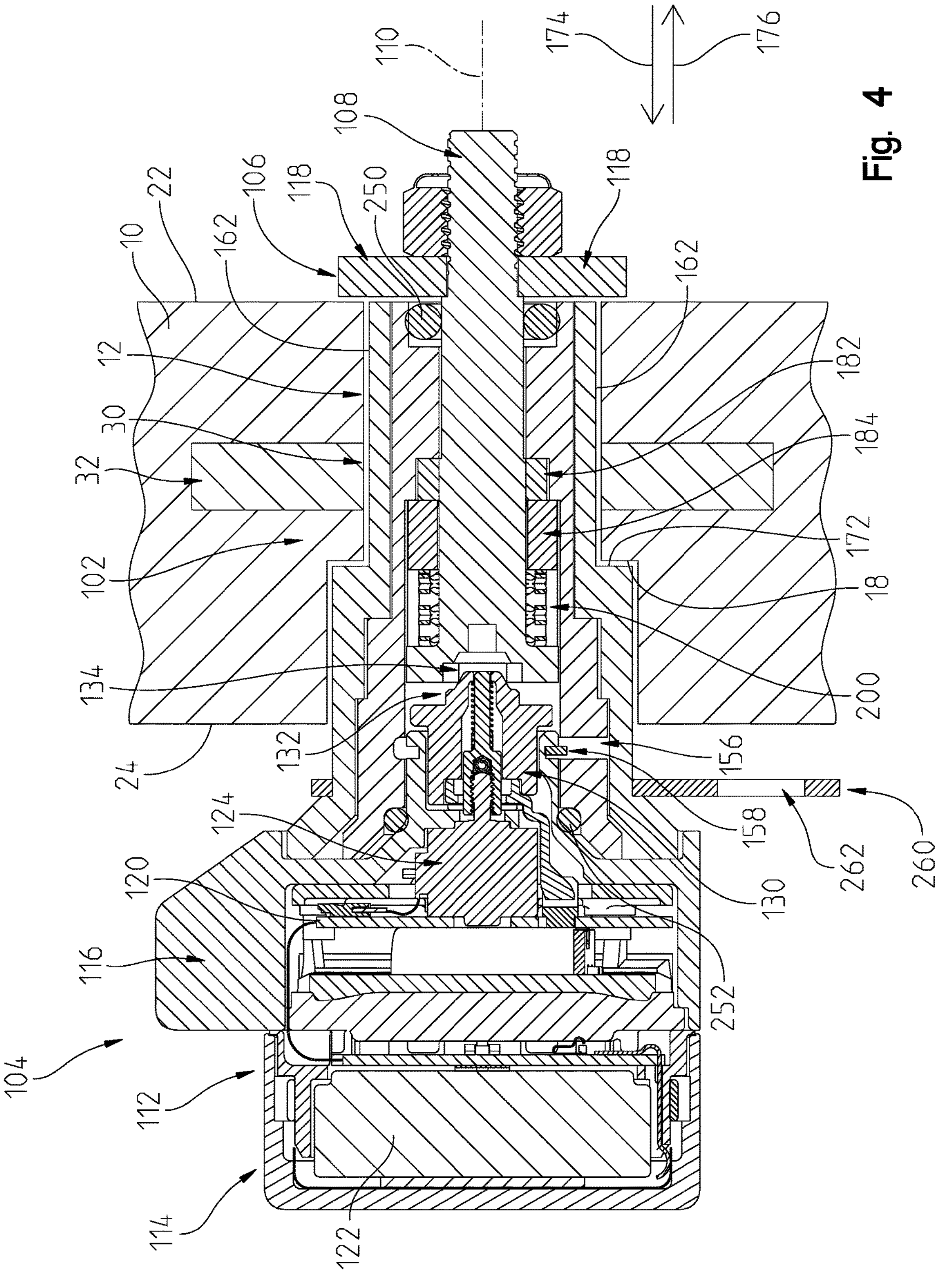
FIG. 4 illustrates a sectional view of the removeable electro-mechanical lock core of FIG. 1 along lines 4-4 in FIG. 1, the removeable electro-mechanical lock core being inserted into a door and through an opening in a bolt lock member with the cam member tailpiece of the removeable electro-mechanical lock core in a locked position.

Referring to FIG. 4, operator actuation assembly 104 further includes an electronic controller 120 including one or more processing circuits, such as microprocessors, and memory which stores processing instructions and/or data. Electronic controller 120 cooperates with a portable user device, such as a mobile phone or fob, to determine if a user has access rights to actuate cam member tailpiece 106 of electro-mechanical lock core 100. In embodiments, the portable user device provides credential information to electronic controller 120 which, in turn, makes a determination whether the operator has access rights to actuate cam member tailpiece 106 of electro-mechanical lock core 100 or not. In embodiments, electronic controller 120 provides credential information to the portable user device which, in turn, makes a determination whether the operator has access rights to actuate cam member tailpiece 106 of electro-mechanical lock core 100 or not. In embodiments, one or both of the portable user device and electronic controller 120 provides credential information to a remote computing device which, in turn, makes a determination whether the operator has access rights to actuate cam member tailpiece 106 of electro-mechanical lock core 100 or not.

Operator actuation assembly 104 further includes a power source 122, illustratively a battery, which powers electronic controller 120 and an electric motor 124. Electric motor 124 drives a clutch 130 to position the clutch 130 relative to drive member 108. An engagement interface 132 of clutch 130 cooperates with an engagement interface 134 of drive member 108 to couple operator actuation assembly 104 to cam member tailpiece 106. In embodiments, electric motor 124 positions clutch 130 in a first position wherein engagement interface 132 of clutch 130 is disengaged from engagement interface 134 of drive member 108 and a second position wherein engagement interface 132 of clutch 130 is engaged with engagement interface 134 of drive member 108. In alternative embodiments, operator actuation assembly 104 is translatable along longitudinal axis 110 towards drive member 108 and electric motor 124 positions clutch 130 in a first position wherein engagement interface 132 of clutch 130 is disengaged from engagement interface 134 of drive member 108 regardless of a longitudinal position of operator actuation assembly 104 along longitudinal axis 110 and a second position wherein engagement interface 132 of clutch 130 is engaged with engagement interface 134 of drive member 108 either by electric motor 124 or when operator actuation assembly 104 is translated along longitudinal axis 110 towards drive member 108.

In the illustrated embodiment, clutch 130 is part of operator actuation assembly 104. In alternative embodiments, clutch 130 is part of core assembly 102 and is operatively coupled to electric motor 124 through one or more couplers. Additional details regarding the structure and operation of operator actuation assembly 104 are provided in U.S. Provisional Application No. 62/829,974, filed Apr. 5, 2019, titled ELECTRO-MECHANICAL LOCK CORE, the entire disclosure of which is expressly incorporated by reference herein.

Returning to FIG. 3, core assembly 102 includes drive member 108, a lock core body 150 having an interior 152, and a sleeve 154 positioned within interior 152 of lock core body 150. Sleeve 154 includes an aperture 156 which receives a retainer 158, illustratively a C-clip, which is also received in a recess 160 of operator actuation assembly 104 to couple operator actuation assembly 104 to core assembly 102. Sleeve 154 is coupled to lock core body 150 with a retainer 170, illustratively a pin (see FIG. 5). Lock core body 150 blocks access to retainer 158 when sleeve 154 is assembled to lock core body 150. Further, retainer 170 prevents the rotation of sleeve 154 relative to lock core body 150 while retainer 158 permits operator actuation assembly 104 to freely spin relative to core assembly 102 while clutch 130 is disengaged from drive member 108. In embodiments, lock core body 150 and sleeve 154 are combined into a single component.

Core assembly 102 further includes an indexer 180. Indexer 180 ensures that as drive member 108 is rotated about longitudinal axis 110 that cam member tailpiece 106 is positioned in one of plurality of predetermined orientations relative to lock core body 150. Indexer 180 includes a first collar 182 and a second collar 184 moveable relative to the first collar 182.

First collar 182 is coupled to drive member 108 to rotate with drive member 108. In the illustrated embodiment, first collar 182 is coupled to drive member 108 through a splined connection. Other exemplary methods of coupling first collar 182 to drive member 108 may be implemented including a fastener, an adhesive, welding, or other suitable coupling means. Second collar 184 is moveably coupled to sleeve 154. In the illustrated embodiment, second collar 184 is coupled to sleeve 154 through a splined connection. Other exemplary methods of coupling second collar 184 to sleeve 154 may be implemented.

Figure 6:
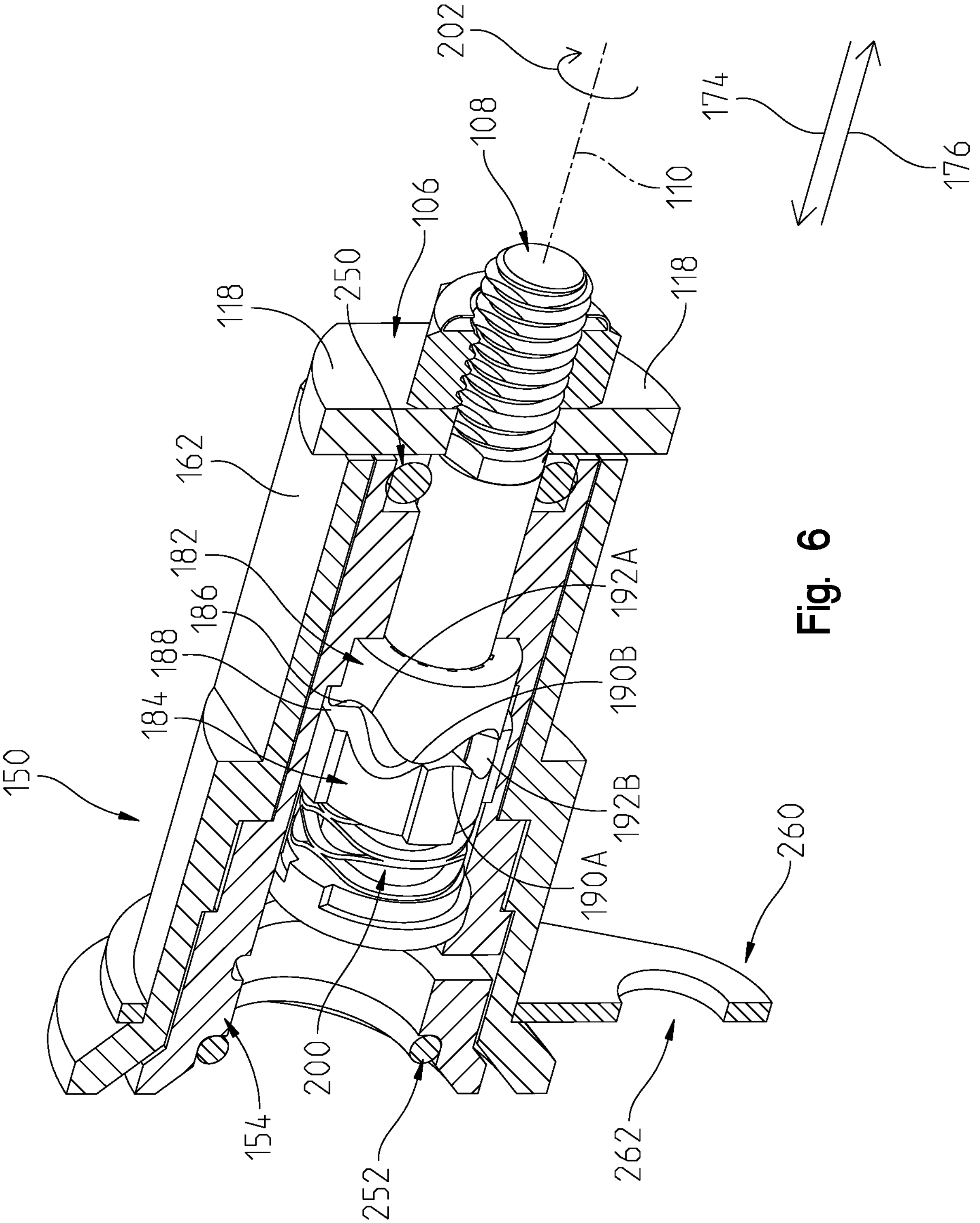
FIG. 6 illustrates a lock core body of the lock core assembly in section to illustrate a driver and locator of the lock core assembly.

Second collar 184 is moveable along longitudinal axis 110 relative to sleeve 154 but is prevented from rotation about longitudinal axis 110 relative to sleeve 154. First collar 182 includes a contoured surface 186 and second collar 184 includes a contoured surface 188 (FIG. 6). Each of contoured surface 186 and contoured surface 188 includes a plurality of detents, protrusions 190 and recesses 192, which mate with corresponding detents, protrusions 190 and recesses 192, of the other of first collar 182 and second collar 184.

A biasing member 200 biases second collar 184 into contact with first collar 182. Illustratively, biasing member 200 is a wave spring or other suitable compression type spring. Referring to FIG. 6, second collar 184 is rotationally misaligned with first collar 182. Due to the biasing force of biasing member 200 on second collar 184, as drive member 108 is rotated in direction 202 about longitudinal axis 110, protrusion 190A of second collar 184 is received in recess 192A of first collar 182, protrusion 190B of first collar 182 is received in recess 192B of second collar 184, and so on around first collar 182 and second collar 184.

When the protrusions 190 and recesses 192 of first collar 182 and second collar 184 are aligned, biasing member 200 provides a resistance to a further rotation of drive member 108 about 110. This resistance provides a tactile feedback to the operator rotating operator actuation assembly 104 and prevents unintended rotation of drive member 108 about longitudinal axis 110 due to vibrations or other environmental characteristics in the absence of an actuation by an operator.

In the illustrated embodiment, each of first collar 182 and second collar 184 includes four protrusions 190 and corresponding recesses 192. This results in indexer 180 having potentially four defined rotational home positions of drive member 108 relative to sleeve 154 about longitudinal axis 110. Each home position is separated from the adjacent position by 90°. Drive member 108 may be rotated from one home position to an adjacent home position through a rotation of operator actuation assembly 104 when clutch 130 is engaged with drive member 108, but indexer 180 will provide a resistance to movement from the current home position of indexer 180 for approximately 50% of the rotation towards the next home position, assist in moving towards the next home position for approximately the next 50% of the rotation towards the next home position, and provide a tactile feedback when the next home position is reached. As first collar 182 is rotated due to a rotation of drive member 108, second collar 184 is translated rearward in direction 174 (see FIG. 6) along longitudinal axis 110 against the bias of biasing member 200 which increases the resistance on further rotation of first collar 182 until first collar 182 has rotated at least halfway towards the next home position and second collar 184 begins to translate forward in direction 176 along longitudinal axis 110. Although four home positions, 90° apart, are possible with first collar 182 and second collar 184, the number of home positions may be adjusted by changing the number of protrusions 190 and recesses 192 on each of first collar 182 and second collar 184.

Referring to FIG. 4, electro-mechanical lock core 100 is inserted into a passageway 12 of a door or frame 10. Electro-mechanical lock core 100 is inserted into passageway 12 until a shoulder 172 of electro-mechanical lock core 100 contacts a shoulder 18 of door or frame 10. At this depth, cam member tailpiece 106 extends beyond a rear side 22 of door or frame 10 while operator actuation assembly 104 remains forward of a front side 24 of door or frame 10. Electro-mechanical lock core 100 also passes through an opening 30 in a bolt 32 which is moveable in a direction orthogonal to the sectional view (in-out of the page) to lock or unlock the door or frame 10 to a surrounding wall or frame (not shown). When electro-mechanical lock core 100 is positioned in opening 30 of bolt 32, bolt 32 is not moveable to unlock the door or frame 10 relative to the surrounding wall or frame. When electro-mechanical lock core 100 is removed from opening 30 of bolt 32, bolt 32 is moveable to unlock the door or frame 10 relative to the surrounding wall or frame.

Figure 7:
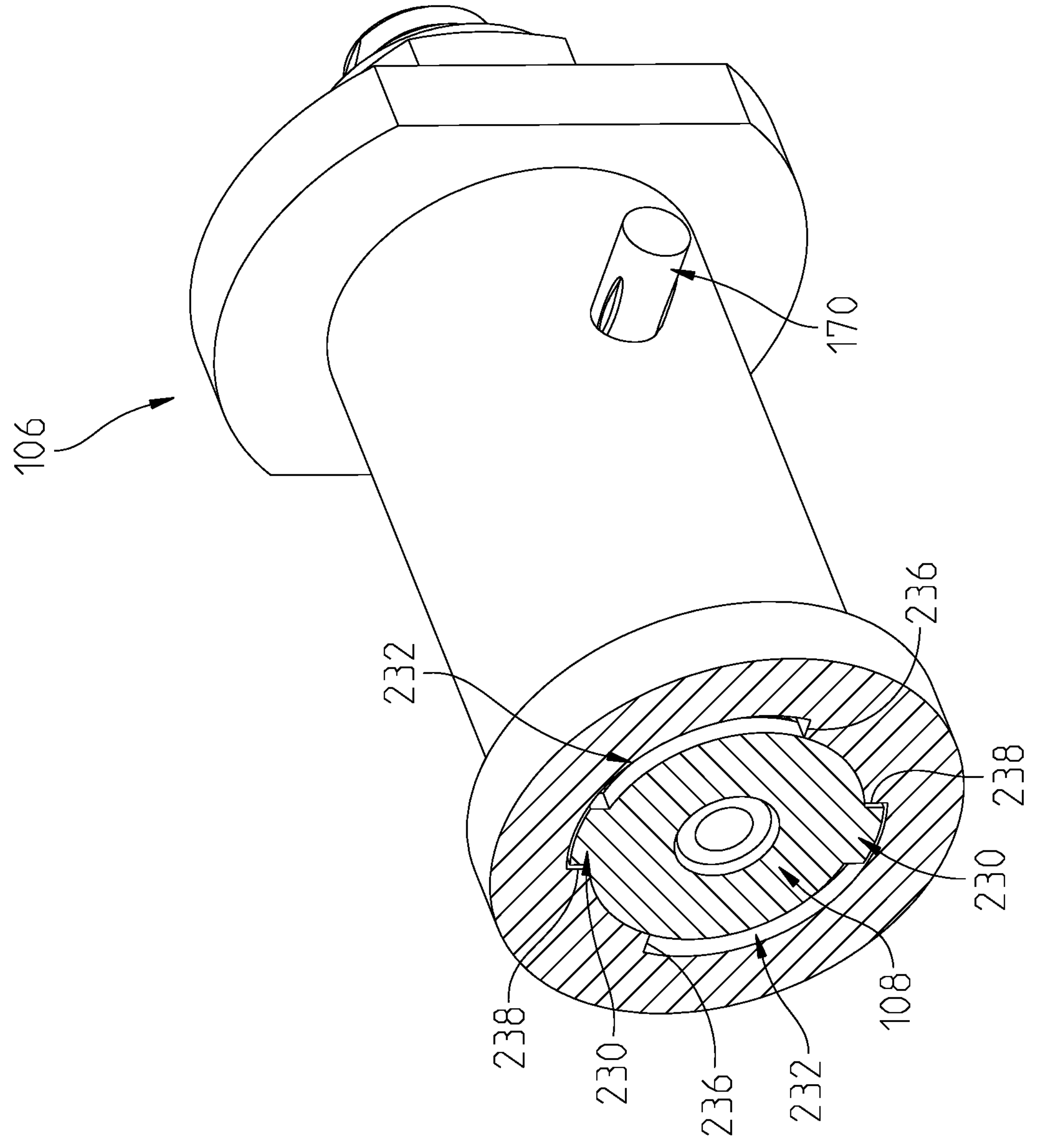
FIG. 7 illustrates a sectional view of the removeable electro-mechanical lock core of FIG. 1 along lines 7-7 in FIG. 1 with the outer lock core body removed for clarity.

Although indexer 180 has four potential home positions, electro-mechanical lock core 100 limits a rotation of drive member 108 about longitudinal axis 110 to two home positions 90° apart. Referring to FIG. 7, drive member 108 includes stops 230 which travel in guides 232 of sleeve 154 as drive member 108 is rotated about longitudinal axis 110 through a defined angular range of movement. Tabs 230 contact stop surfaces 236 at a first rotational limit of drive member 108 and contact stop surfaces 238 at a second rotational limit of drive member 108. In other embodiments, a pin may be placed in an annular groove of sleeve 154 to limit a rotation of drive member 108 about longitudinal axis 110.

Figure 2:
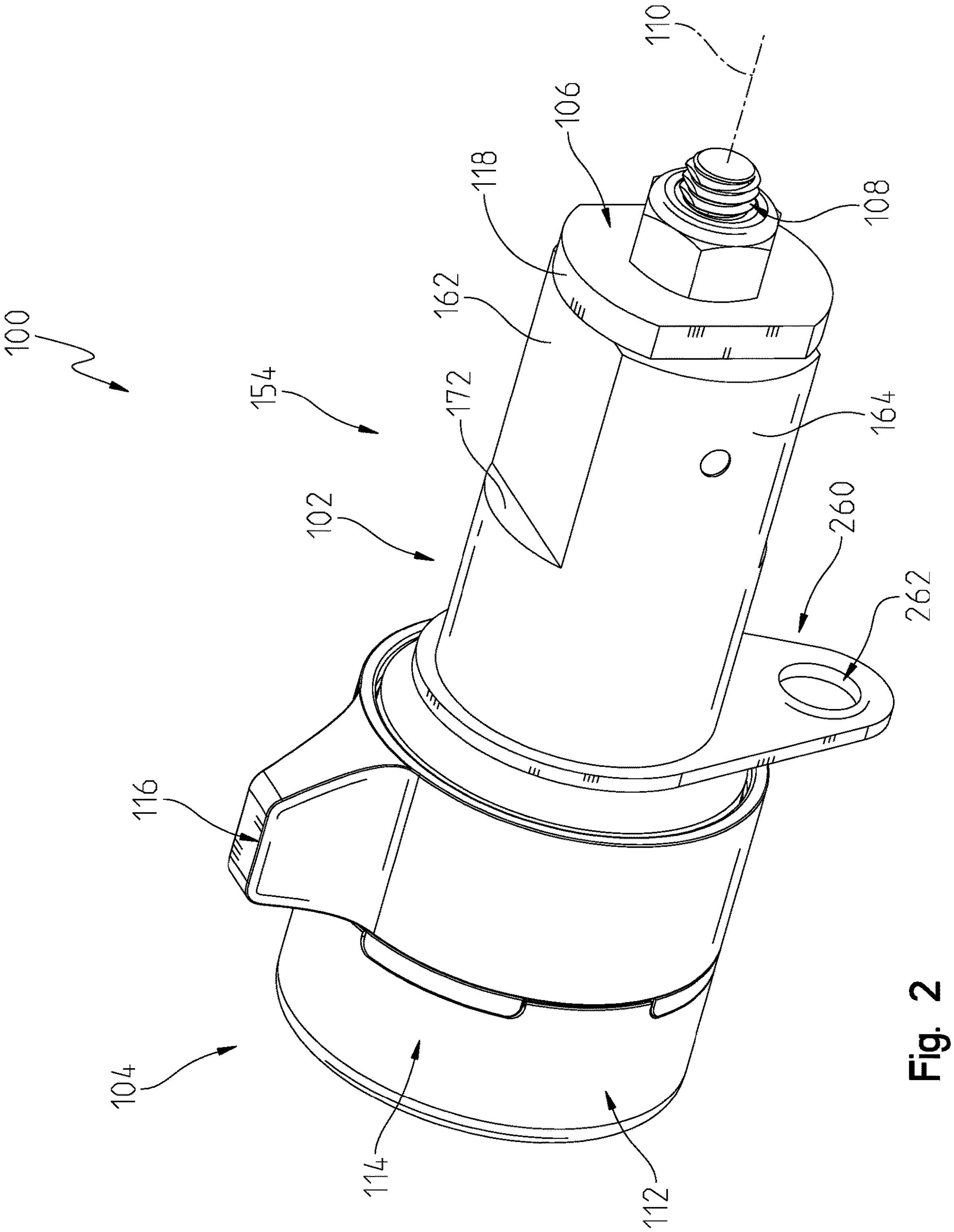
FIG. 2 illustrates a rear perspective view of the removeable electro-mechanical lock core of FIG. 1.
Figure 3:
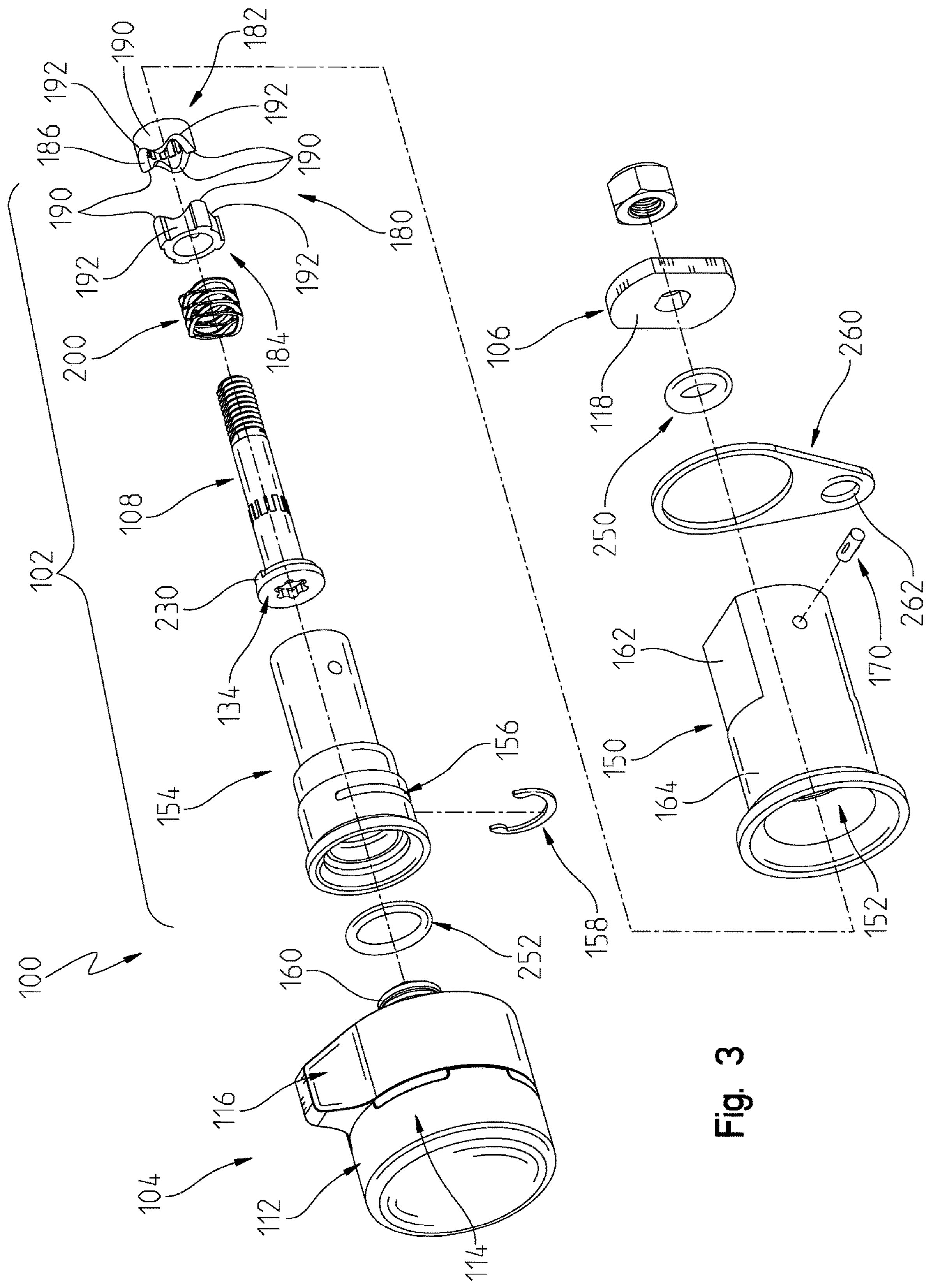
FIG. 3 illustrates an exploded view of a lock core assembly of the removeable electro-mechanical lock core of FIG. 1 and an operator actuatable assembly of the removeable electro-mechanical lock core of FIG. 1.
Figure 4A:
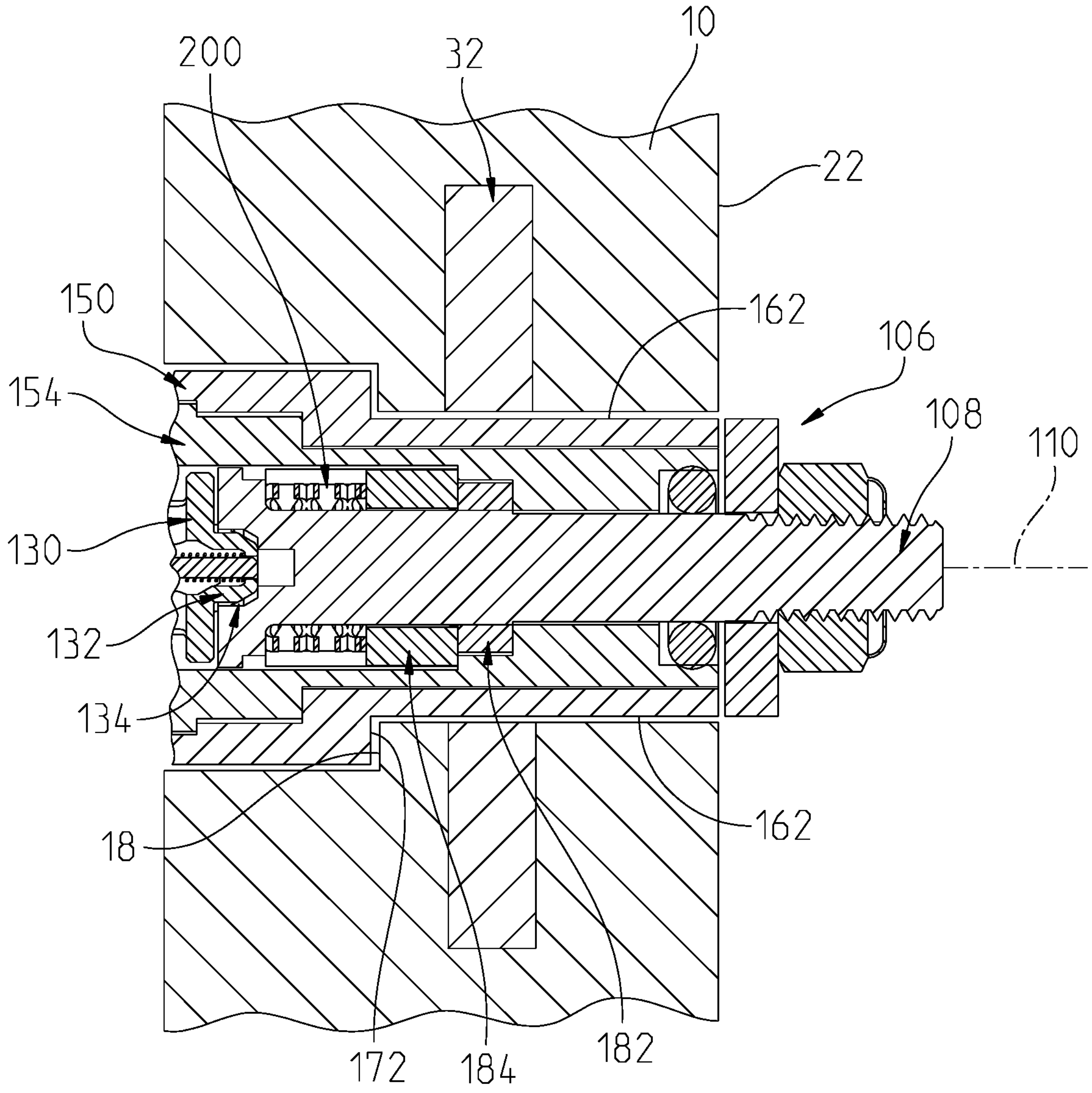
FIG. 4A illustrates a partial sectional view of the assembly in FIG. 4 with the cam member tailpiece of the removeable electro-mechanical lock core in an unlocked position.
Figure 5:
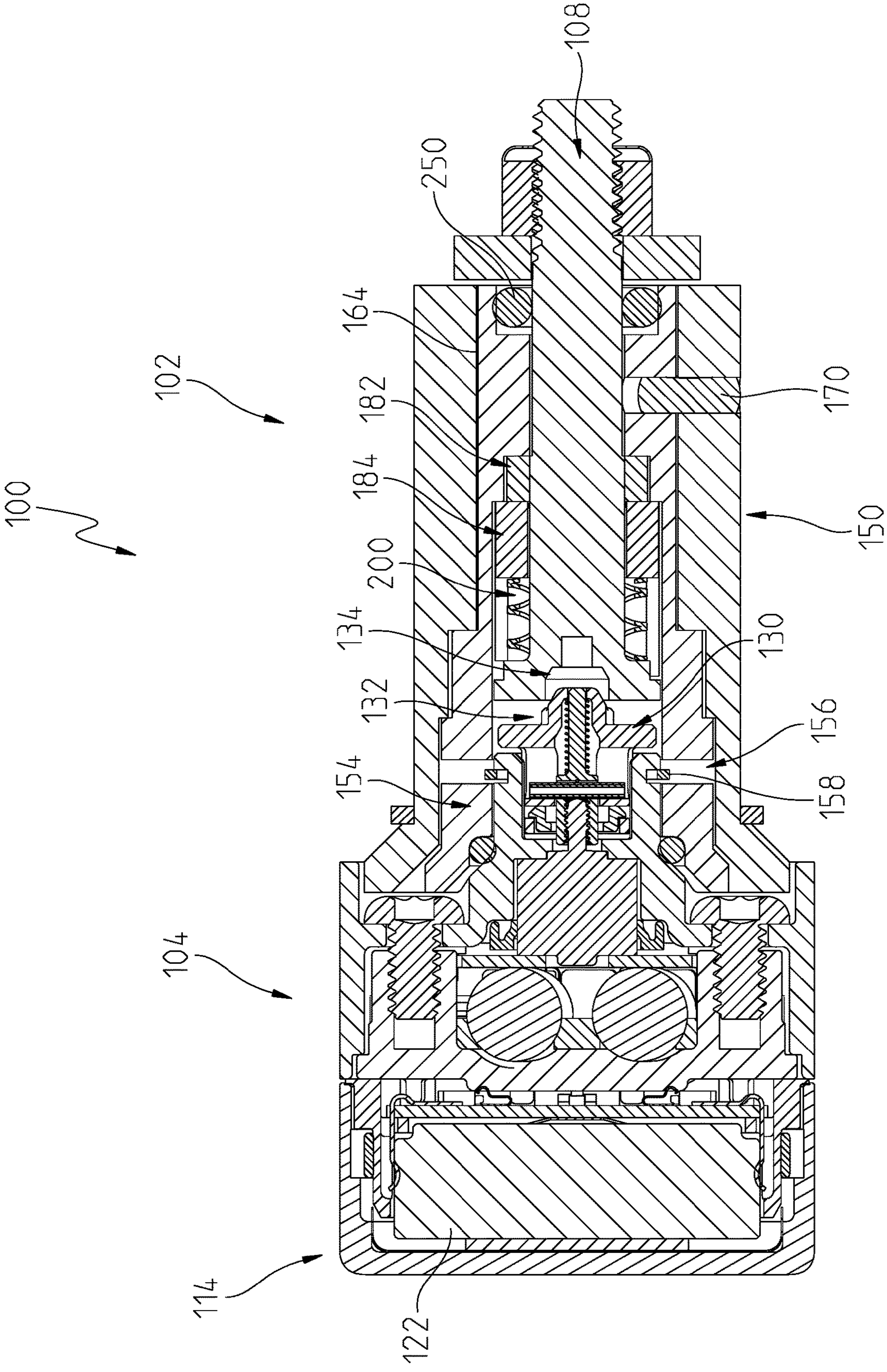
FIG. 5 illustrates a sectional view of the removeable electro-mechanical lock core of FIG. 1 along lines 5-5 in FIG. 1.

A first home position is a locked position wherein cam member tailpiece 106 is rotated about longitudinal axis 110 so that elongated portions 118 of cam member tailpiece 106 extend over a portion of rear side 22 of door or frame 10 (see FIG. 4) and beyond surfaces 162 of sleeve 154 (see FIGS. 2 and 4). In this position a portion of an outer cam member tailpiece envelope of cam member tailpiece 106 extends outside of the exterior lock core body envelope of lock core body 150, illustratively elongated portions 118 of cam member tailpiece 106 extend beyond the envelope about longitudinal axis 110 made by surfaces 162 and 164 of lock core body 150. When first collar 182 and second collar 184 are in the first home position, stops 230 of drive member 108 contact stop surfaces 238 of guides 232 in sleeve 154. A second home position is an unlocked position wherein cam member tailpiece 106 is rotated about longitudinal axis 110 so that elongated portions 118 are aligned with surface 164 (see FIG. 4A) of sleeve 154 and cam member tailpiece 106 no longer overlaps a portion of rear side 22 of door or frame 10 (see FIG. 4A). In the unlocked position, electro-mechanical lock core 100 may be removed from passageway 12 of door or frame 10. When first collar 182 and second collar 184 are in the second home position, stops 230 of drive member 108 contact stop surfaces 236 of guides 232 in sleeve 154.

Referring to FIG. 4, liquid and/or debris ingress into the interior of sleeve 154 is minimized by a first seal 250 positioned about drive member 108 and received in a recess in sleeve 154 and a second seal 252 positioned about operator actuation assembly 104 and received in a recess of sleeve 154. Additionally, adhesive may be placed in opening 156 which receives retainer 158. In embodiments, a silicone cover (not shown) may be placed over the exterior of operator actuation assembly 104.

A bracket 260 is provided having a first opening sized to be received over an outer surface of lock core body 150. Bracket 260 further includes a second opening 262 which may receive a cable that is used to tether electro-mechanical lock core 100 to an adjacent wall or frame.

Figure 8:
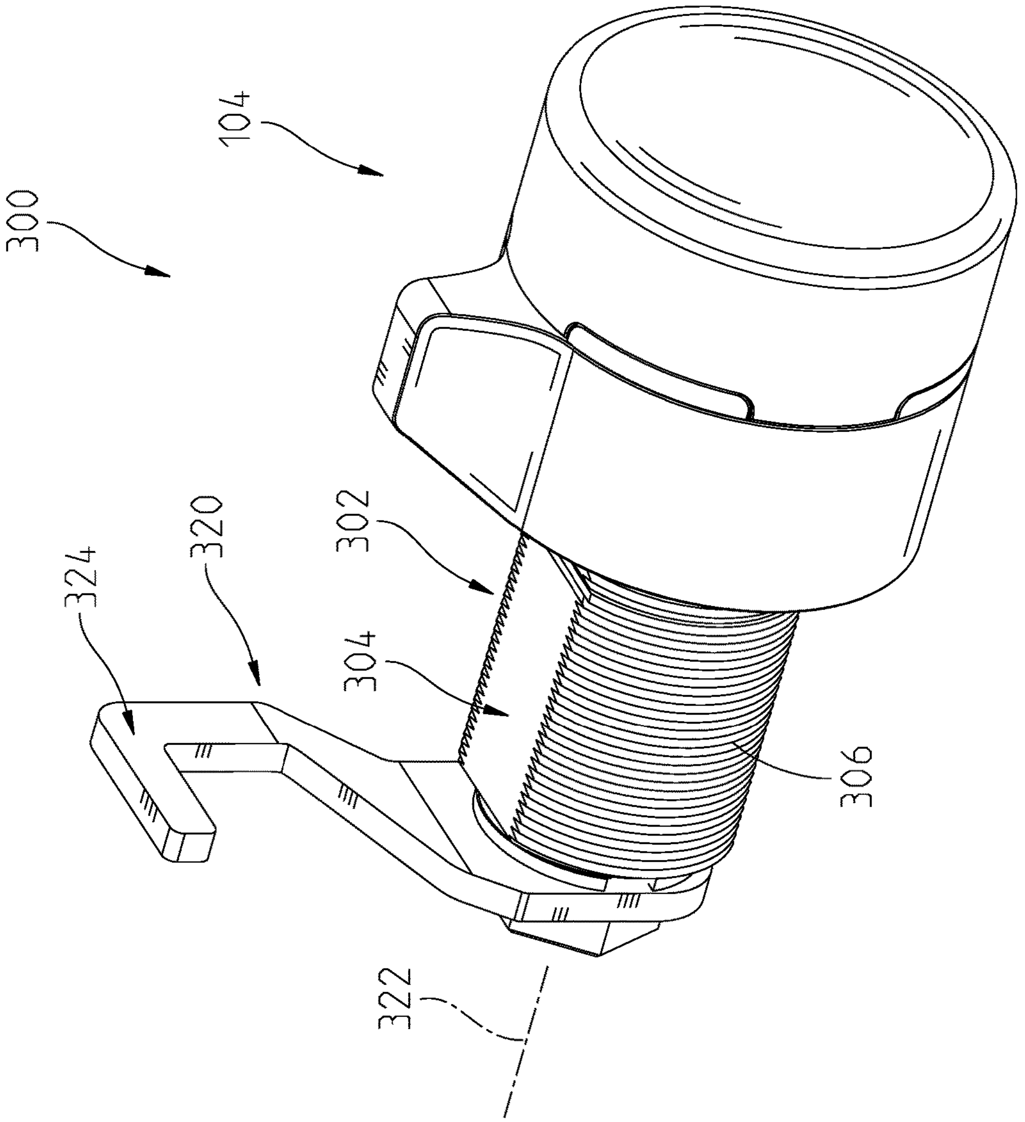
FIG. 8 illustrates a front perspective view of another removeable electro-mechanical lock core with a cam member tailpiece.
Figure 9:
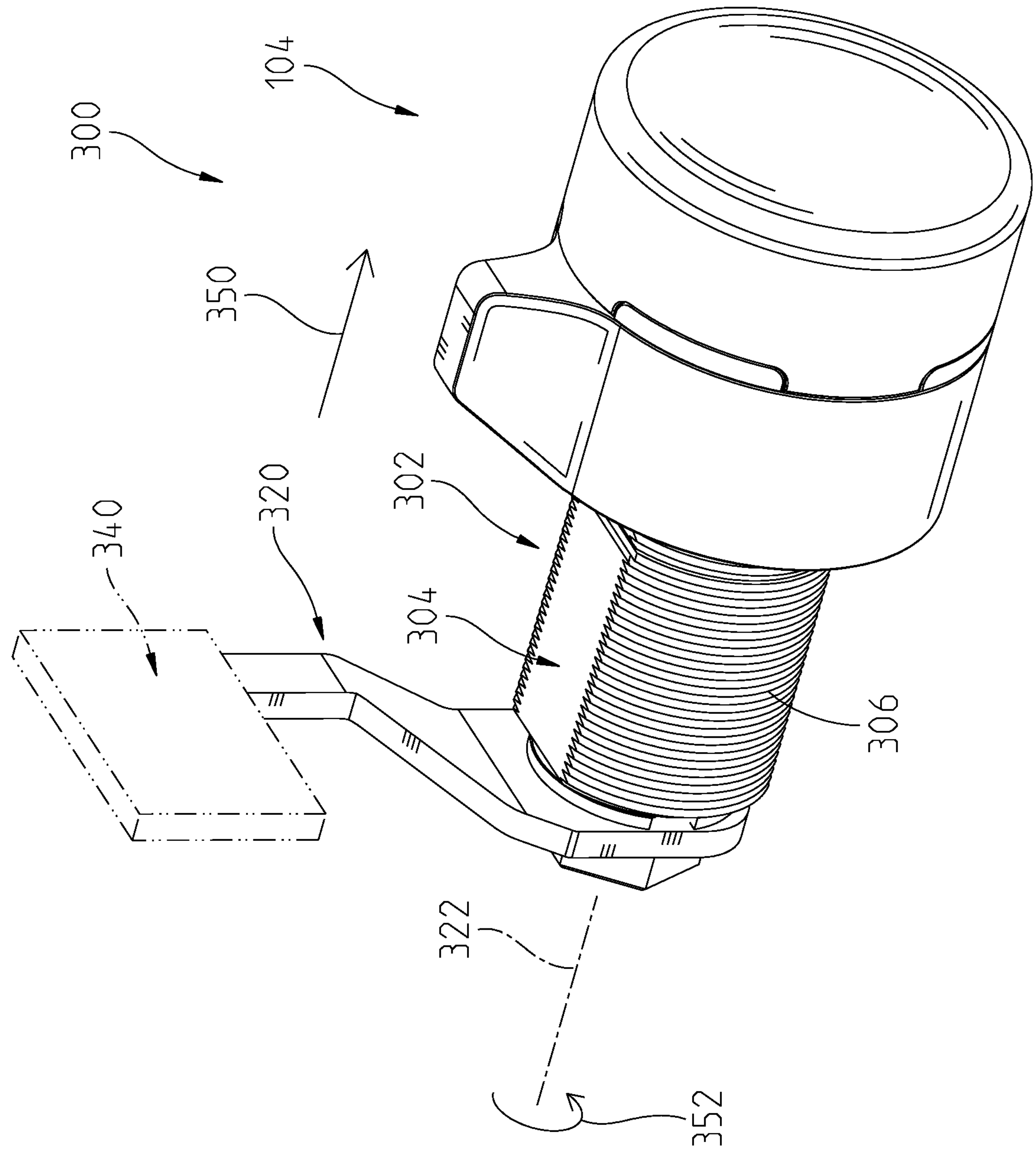
FIG. 9 illustrates the removeable electro-mechanical lock core of FIG. 8 with the cam member tailpiece in a locked position relative to a retainer of a barrier.
Figure 10:
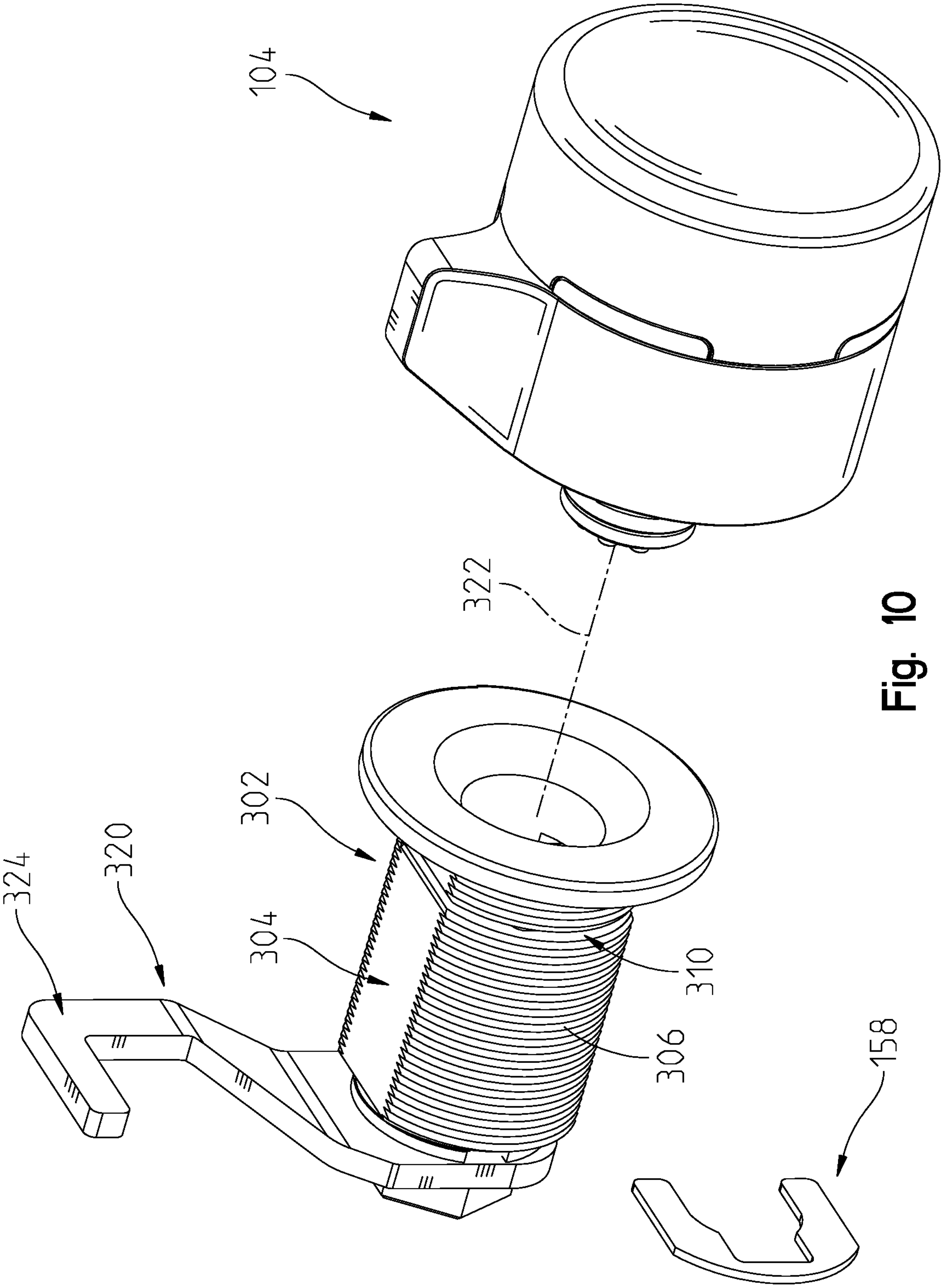
FIG. 10 illustrates the removeable electro-mechanical lock core of FIG. 8 with the operator actuatable assembly uncoupled from the lock core assembly.

Referring to FIGS. 8-10, another exemplary electro-mechanical lock core 300 is disclosed. Electro-mechanical lock core 300 includes operator actuation assembly 104 and a lock core assembly 302 having a lock core body 304 with a threaded exterior 306. Lock core assembly 302 includes the same internals as core assembly 102 except that a separate sleeve, similar to sleeve 154, is not included, but rather lock core assembly 302 includes an opening 310 (see FIG. 10) which receives retainer 158 to couple operator actuation assembly 104 to lock core assembly 302 and lock core body has the same internal geometry as sleeve 154.

Electro-mechanical lock core 300 includes drive member 108 to which a cam member tailpiece 320 is coupled. Cam member tailpiece 320 rotates about axis 322 due to a rotation of drive member 108 about axis 322. Cam member tailpiece 320 is shown in a locked position in FIG. 9 wherein an end 324 (see FIG. 8) of cam member tailpiece 320 is positioned behind a catch 340 which is coupled to a frame (not shown) and prevents the movement of cam member tailpiece 320 and hence the door that electro-mechanical lock core 300 is coupled to from generally moving in direction 350.

When operator actuation assembly 104 is coupled to drive member 108, a rotation of operator actuation assembly 104 about axis 322 in direction 350 causes a rotation of drive member 108 and cam member tailpiece 320 also in direction 352. This rotation moves 324 away from catch 340 such that electro-mechanical lock core 300 is moveable in direction 350 past catch 340. When end 324 does not overlap catch 340 along direction 350, electro-mechanical lock core 300 is in an unlocked position. End 324 of cam member tailpiece 320 is positioned outside of an exterior envelope of lock core body in both the locked position and the unlock position of cam member tailpiece 320.

Electro-mechanical lock core 300, in embodiments, is received in a bore (not shown) such as in a drawer and a nut (not shown) is threaded onto threaded surface 306 to retain electro-mechanical lock core 300 relative to the drawer.

Figure 11:
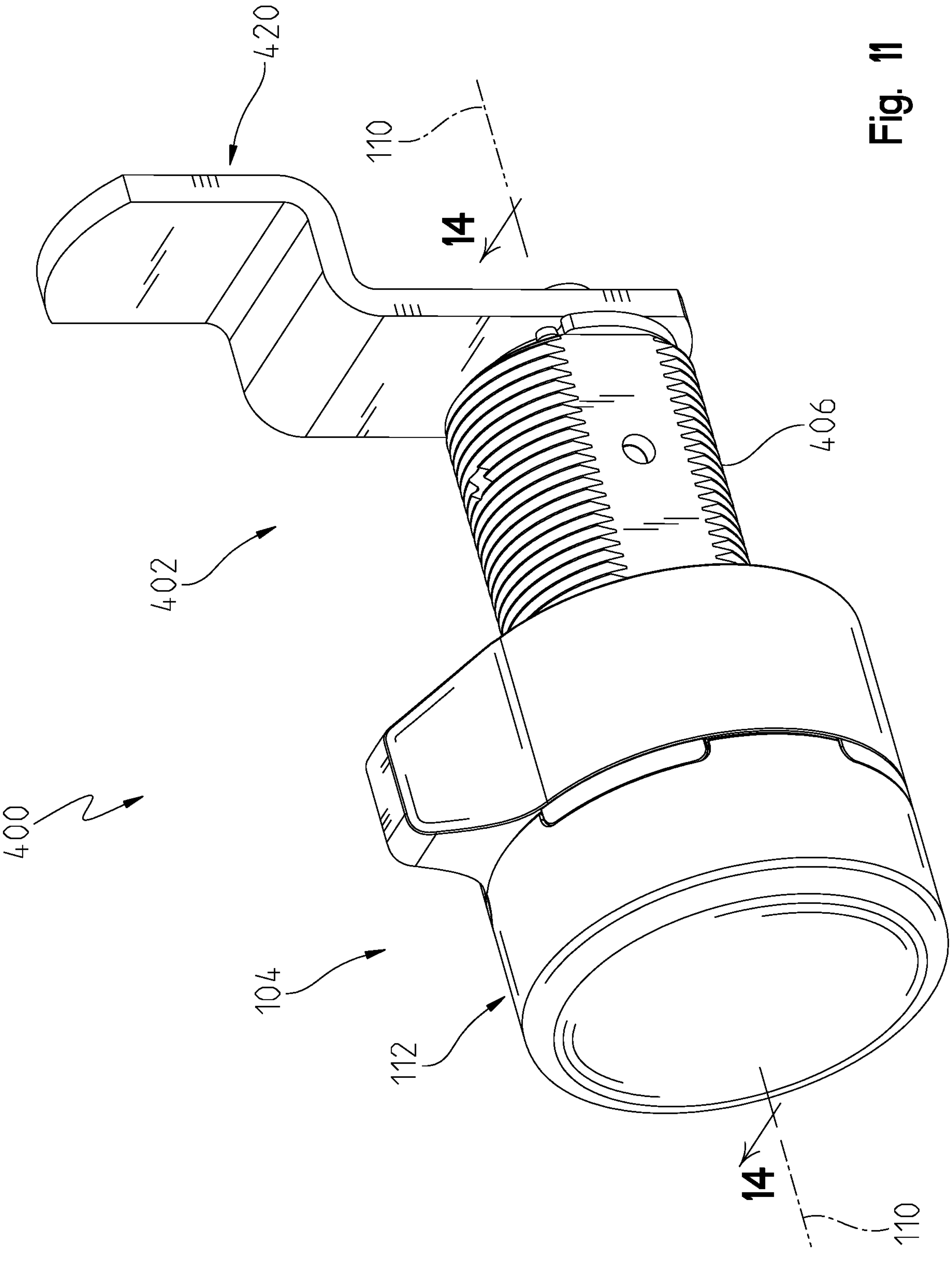
FIG. 11 is a front perspective view of an additional embodiment of a removable electro-mechanical lock core.
Figure 12:
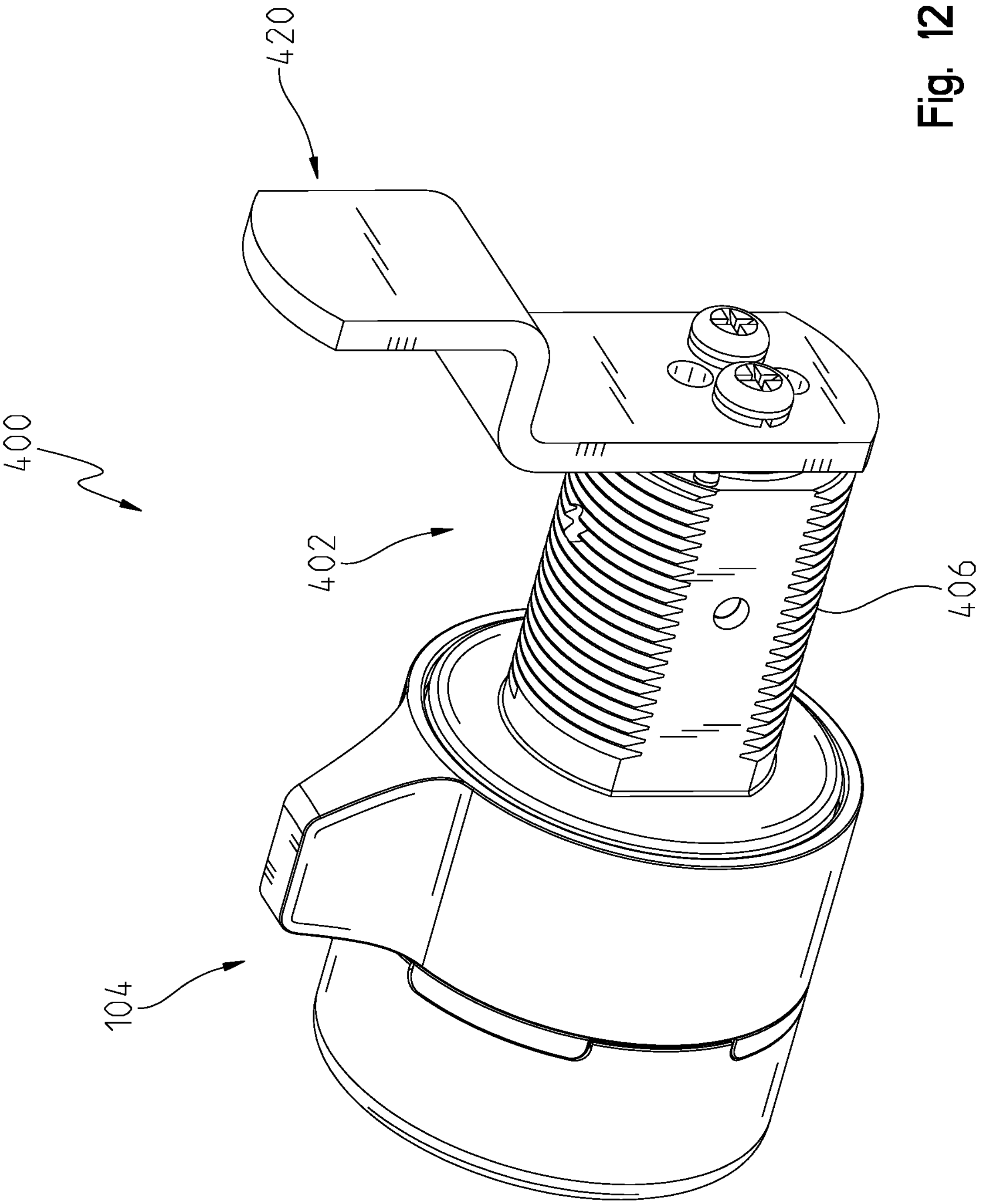
FIG. 12 is a rear perspective view of the removeable electro-mechanical lock core of FIG. 11.
Figure 13:
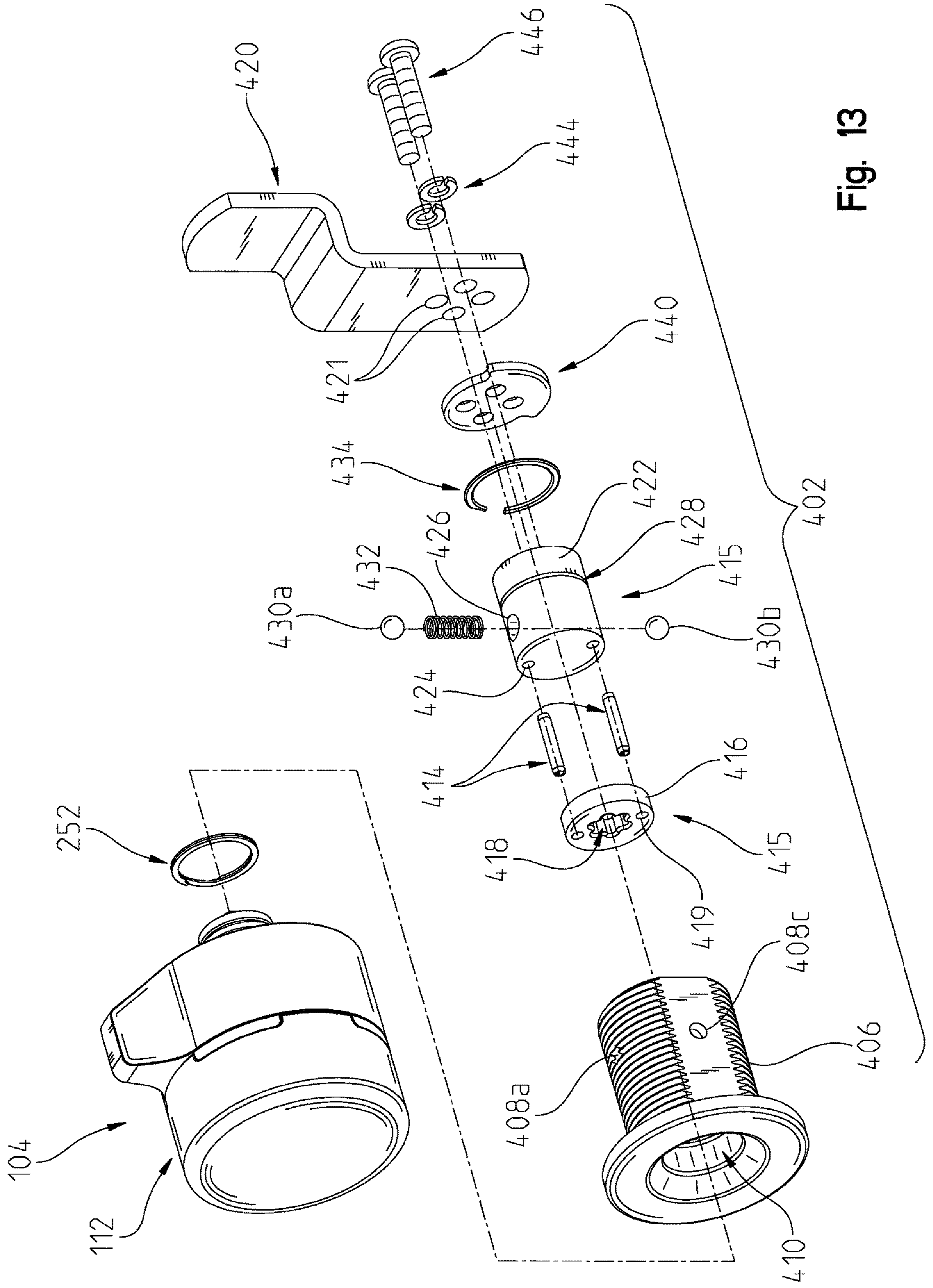
FIG. 13 is an exploded view of the removeable electro-mechanical lock core of FIG. 11.

FIGS. 11 and 12 illustrate perspective views of an additional embodiment electro-mechanical lock core 400, also referred to as a cam lock, having a core assembly 402 and operator actuation assembly 104 coupled to core assembly 402. The structure and operation of operator actuation assembly 104 is similar to, or the same as, the structure and operation of operator actuation assembly 104 as described with reference to FIGS. 1-10. As explained herein below in more detail, in certain configurations, operator actuation assembly 104 may be actuated to rotate a cam member tailpiece 420 about longitudinal axis 110 through the rotation of a drive member 415 of core assembly 402 about longitudinal axis 110. Drive member 415 may be a two-part assembly including drive member input 416 (FIG. 13) and drive member output 422 (FIG. 13). In other embodiments, drive member 415 is an integral one piece assembly. Cam member tailpiece 420 may be rotated from a first cam member tailpiece position wherein an end of cam member tailpiece 420 is aligned with catch 340 (FIG. 9) of a door or barrier to prevent opening of the door or barrier, to a second cam member tailpiece position wherein the end of cam member tailpiece 420 is generally unaligned with catch 340 to allow opening of the door or barrier.

Figure 14:
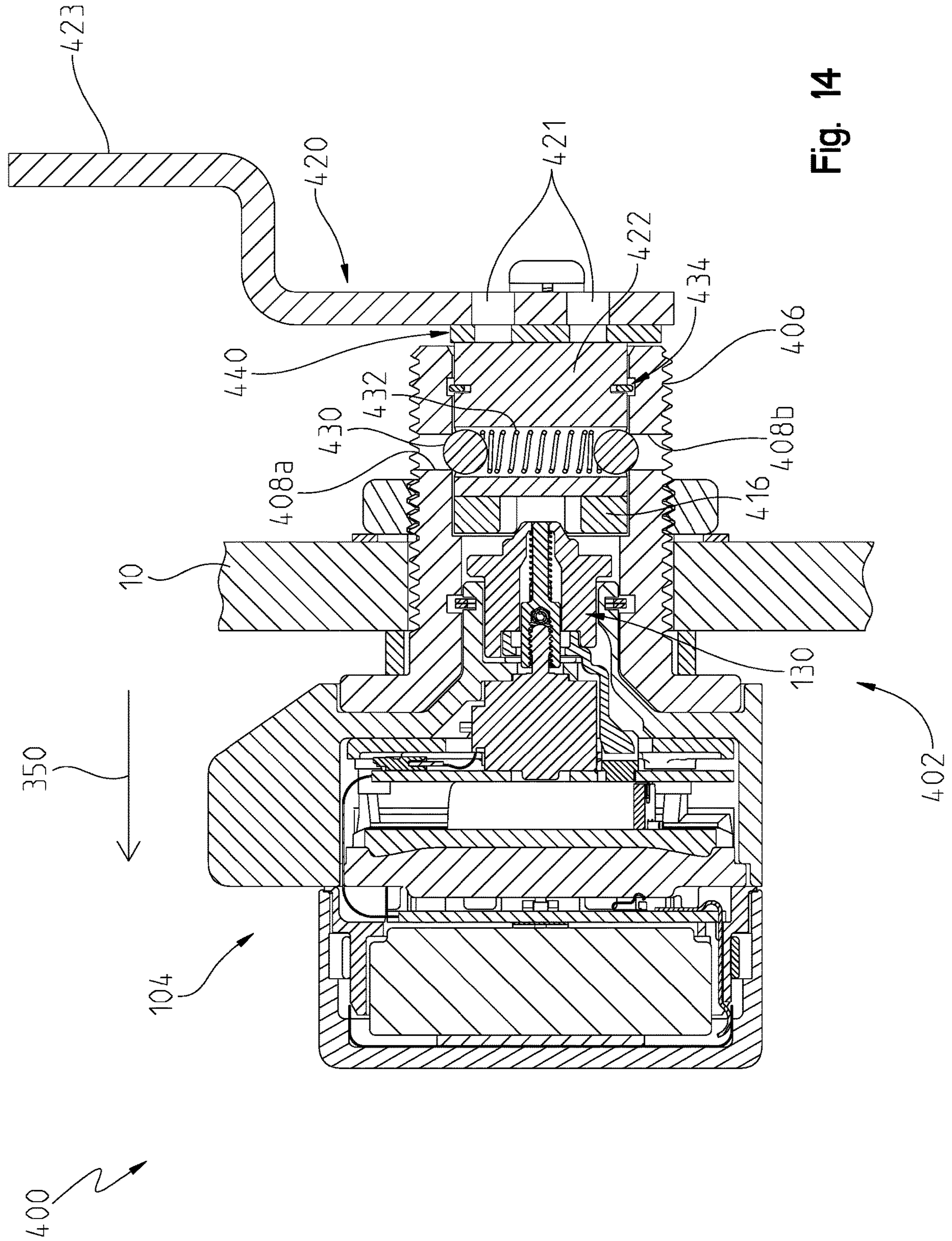
FIG. 14 is a cross-sectional view of the removeable lock core of FIG. 11 taken along line 14-14 of FIG. 11.

Referring to FIGS. 13-14, core assembly 402 comprises a lock core body 406 having an interior region 410, drive member input 416 and drive member output 422, and a plurality of pins 414. Interior region 410 extends through lock core body 406 along (i.e., parallel to or coincidental with) longitudinal axis 110 (FIG. 11) and receives drive member input 416 and drive member output 422. Drive member input 416 comprises a central opening 418 and a plurality of openings, illustratively a plurality of pin receivers 419, on opposing sides of central opening 418 for receiving at least two of the plurality of pins 414. Drive member output 422 also includes a plurality of openings 424 for receiving the at least two pins 414 that are received by drive member input 416, such that drive member input 416 and drive member output 422 are operatively coupled. Additionally, drive member output 422 comprises a groove 428 for receiving a retainer, illustratively a C-clip 434, to couple lock core body 406 and drive member output 422. Drive member output 422 additionally comprises a passageway 426 extending through drive member output 422 along an axis transverse to longitudinal axis 110 (FIG. 11), which is sized to receive a biasing element, illustratively a spring 432, and a plurality of bearings 430. As illustrated in FIG. 13, the plurality of bearings 430 comprises a first bearing 430*a* and a second bearing 430*b*.

Lock core body 406 may comprise a plurality of openings, illustratively a plurality of bearing receivers 408, arranged circumferentially around lock core body 406. When drive member output 422 and bearings 430 are in a first home position, as is illustrated in FIG. 14, a first bearing receiver 408*a* and a second bearing receiver 408*b* receive bearings 430 of drive member output 422. Lock core body 406 further comprises a third bearing receiver 408*c* and a fourth bearing receiver (not shown) that may receive bearings 430 when drive member output 422 and bearings 430 are in a second home position, as will be described further herein. Bearing receivers 408 are arranged circumferentially around lock core body 406 with the first bearing receiver 408*a* and second bearing receiver 408*b* positioned on opposite sides of lock core body 406, nominally 180 degrees apart. Third bearing receiver 408*c* and fourth bearing receiver are positioned on opposing sides of lock core body 406, nominally 180 degrees apart. In this way, first bearing receiver 408*a* is approximately 90 degrees from third bearing receiver 408*c*, and second bearing receiver 408*b* is approximately 90 degrees from fourth bearing receiver (not shown).

Further, core assembly 402 comprises a retainer 440 positioned adjacent drive member output 460 and cam member tailpiece 420. In assembly, cam member tailpiece 420 is secured to retainer 440 through reception of washers 444 and bolts 446 within a plurality of openings 421. Bolts 446 may extend through into at least a portion of drive member output 422, operatively coupling cam member tailpiece 420 with drive member output 422.

Operator actuation assembly 104 comprises clutch 130 for reversible engagement with core assembly 402, similar to as described with reference to electro-mechanical lock core 100. Clutch 130 comprises an engagement interface compatible for engaging an engagement interface of drive member 415, for example the inner surface of central opening 418 of drive member input 416. In various embodiments, clutch 130 has a first and disengaged position wherein clutch 130 fails to engage drive member input 416, and a second and engaged position wherein clutch 130 is engaged with drive member input 416. When in the first position, operator actuation input 112 is capable of free rotation relative to core assembly 402, such that rotation of operator actuation input 112 does not cause rotation of components of core assembly 402. When in the second position of clutch 130, clutch is engaged such that rotation of operator actuation input 112 may cause rotation of core assembly 402. In the second position of clutch 130, operator actuation input 112 may be limited to a defined angular range for rotation of about 90 degrees clockwise or 90 degrees counterclockwise as a result of the first and second home positions of bearings 430.

As illustrated in FIG. 14, spring 432 biases bearings 430 outwards such that bearings 430 extend at least partially out of passageway 426 and into first and second bearing receivers 408*a*, 408*b* of lock core body 406. As such, bearings 430 are in the first home position and inhibit rotation of drive member output 422 relative to the lock core body 406 prior to rotation of operator actuation input 112. Cam member tailpiece 420 is thus biased in the first cam member tailpiece positioning. In this position, end portion 423 of cam member tailpiece 420 is positionable behind a catch (for example 340 of FIG. 9) which may be coupled to a frame (not shown) and prevents movement of cam member tailpiece 420 and hence the door or barrier that electro-mechanical lock core 400 is coupled to from generally moving in direction 350.

When operator actuation input 112 is rotated, drive member input 416 and drive member output 422 are rotated, and bearings 430 are forced into contact with the wall defining interior region 410 of lock core body 406. Bearings 430 are thus forced inward within passageway 426 and compress spring 432. Once bearings 430 are fully withdrawn into passageway 426 and do not extend into bearing receivers 408*a*, 408*b* any longer, operator actuation input 112 can be continuously rotated until bearings 430 reach a third bearing receiver 408*c* and a fourth bearing receiver (not shown) of lock core body 406. Once bearings 430 reach third bearing receiver 408*c* and fourth bearing receiver, spring 432 returns to an extended position and bias bearings 430 outward, causing bearings 430 to extend partially out of third bearing receiver 408*c* and fourth bearing receiver of lock core body 406. In various embodiments, the extension of bearings 430 into third bearing receivers 408*c* and fourth bearing receiver causes a clicking sound that may signify that bearings 430 are in the second home position.

When drive member input 416 and drive member output 422 rotate as bearings 430 are rotated from the first home position to the second home position, cam member tailpiece 420 rotates to the second cam member tailpiece position. In the second position, cam member tailpiece 420 has been rotated approximately 90 degrees and end portion 423 of cam member tailpiece 420 may no longer by positioned behind catch of the frame, allowing movement of the electro-mechanical lock core 400 and thus the door or barrier to which it is coupled, in the general direction 350.

Figure 15:
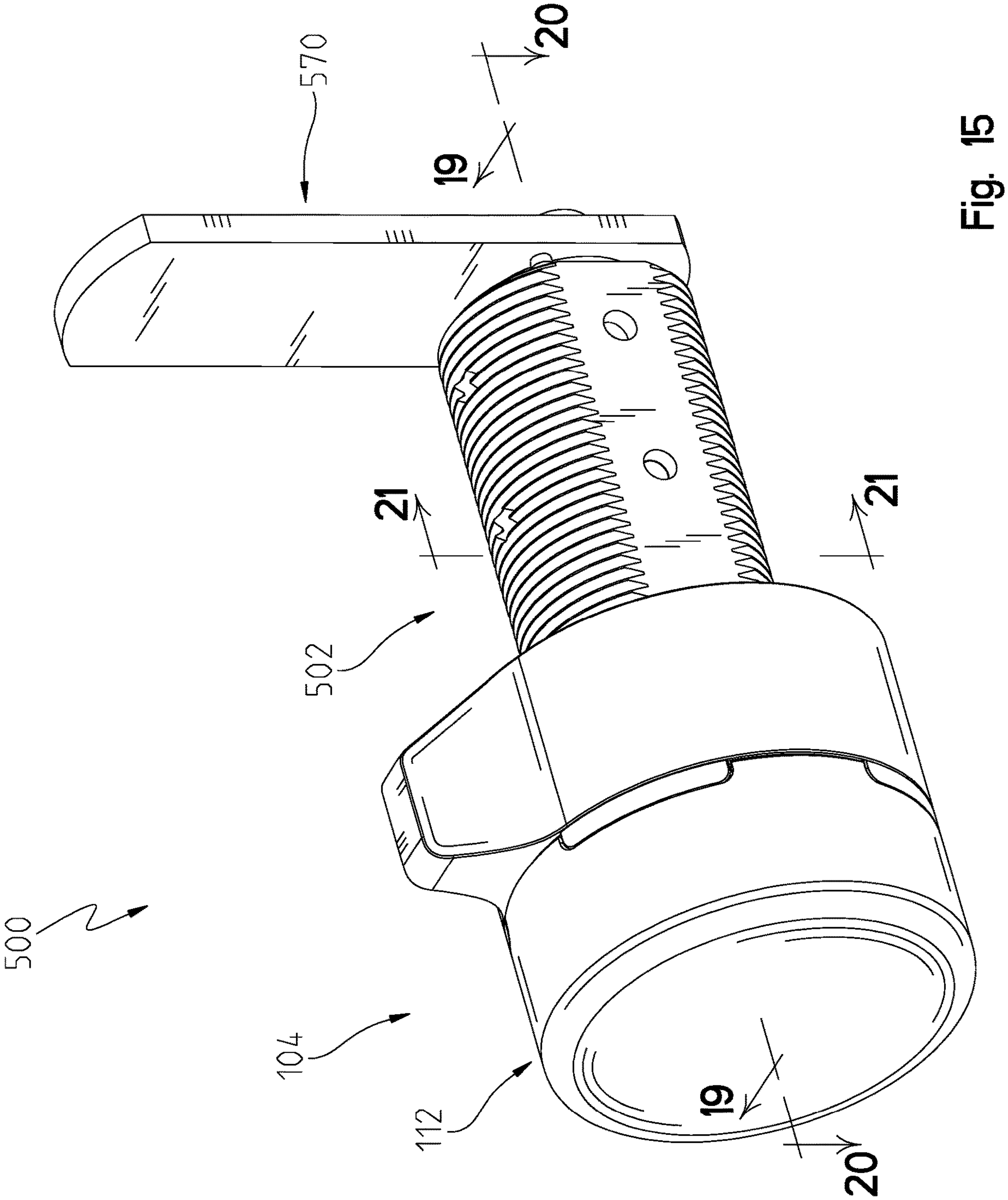
FIG. 15 is a front perspective view of another additional embodiment of a removable electro-mechanical lock core.
Figure 16:
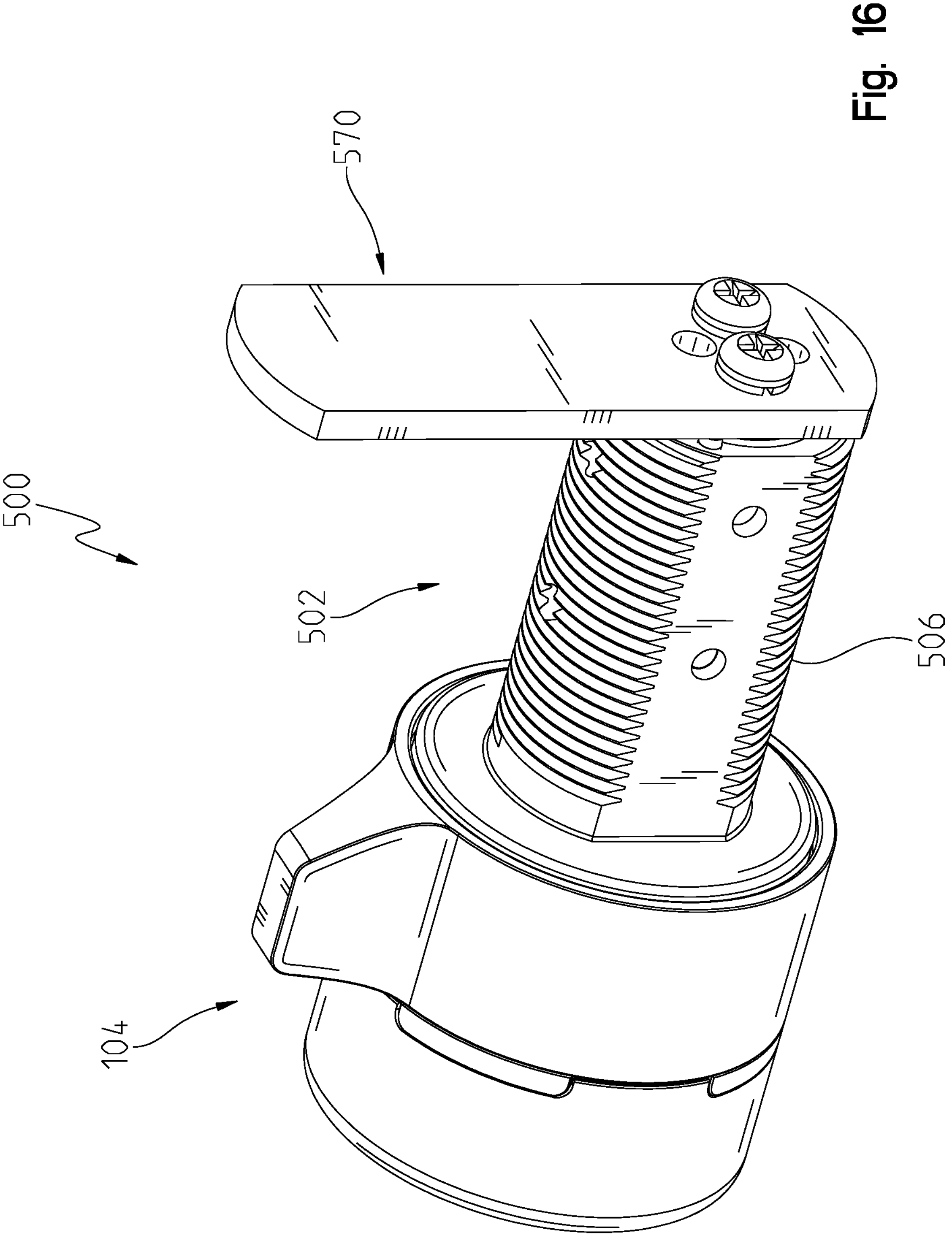
FIG. 16 illustrates a rear perspective view of the removable electro-mechanical lock core of FIG. 15.
Figure 17:
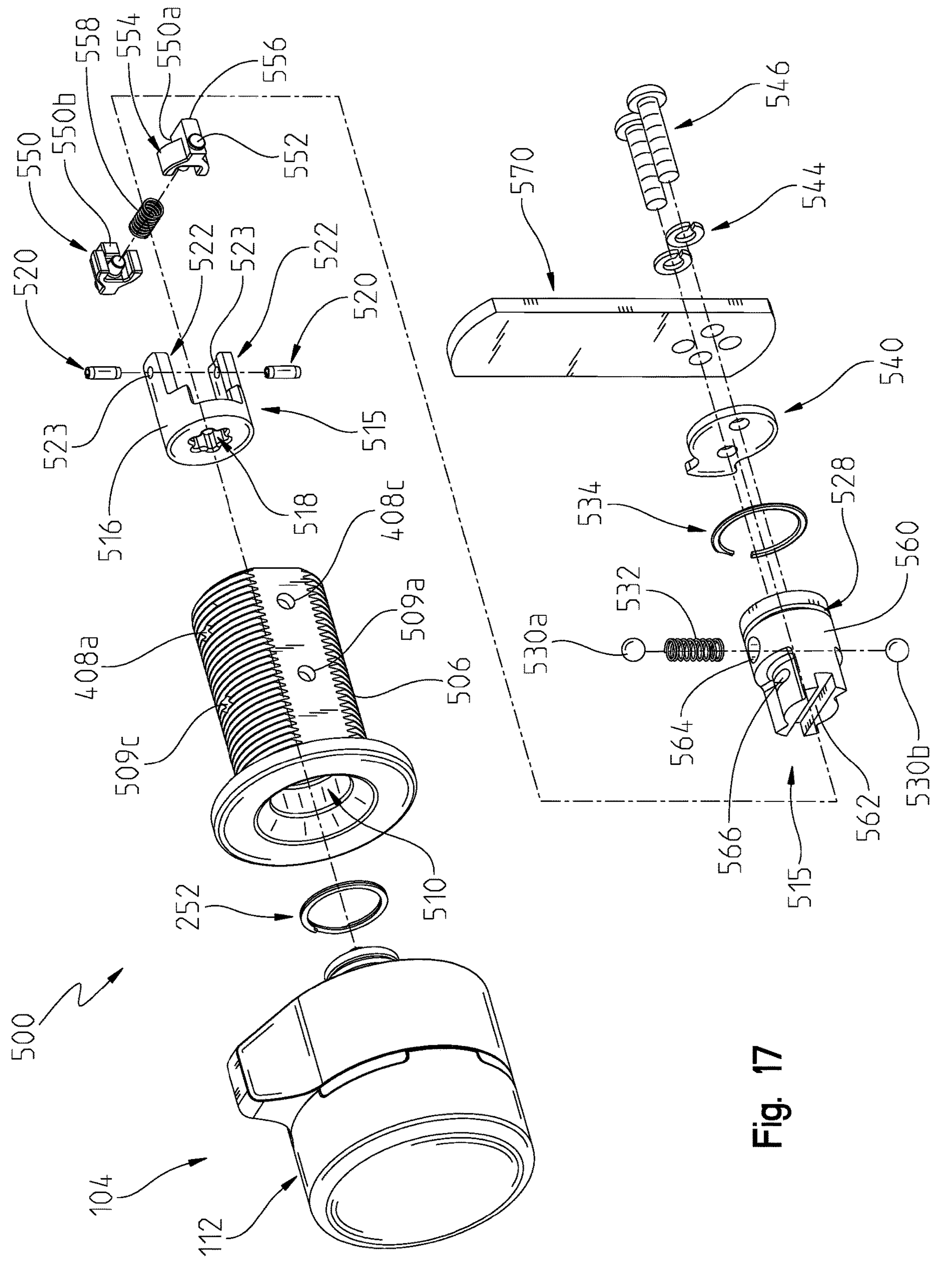
FIG. 17 is an exploded view of the removeable electro-mechanical lock core of FIG. 15.

FIGS. 15-23 illustrates an additional embodiment of an electro-mechanical lock core 500, also referred to as a cam lock. Electro-mechanical lock core 500 comprises a core assembly 502 and operator actuation assembly 104. The structure and operation of operator actuation assembly 104 are the same as the structure and operation of operator actuation assembly 104 as described with reference to FIGS. 1-14. As explained here in more detail, in certain configurations, operator actuation assembly 104 may be actuated to rotate a cam member tailpiece 570 through the rotation of drive member 515 about longitudinal axis 110 such that electro-mechanical lock core 400 rotates from a first and locked position to a second and unlocked position. As illustrated in FIG. 17, drive member 515 is a two-part assembly comprising drive member input 516 and drive member output 560. Drive member input 516 and drive member output 560 are rotatably relative to one another within a certain angular range, as will be described further herein.

FIG. 17 illustrates an exploded view of electro-mechanical lock core 500. Core assembly 502 comprises a lock core body 506 including the plurality of bearing receivers 408, and a plurality of openings 509 including at least four openings 509*a-d* axially spaced from the plurality of bearing receivers 408 and circumferentially spaced from one another. Lock core body 506 comprises an interior region 510 aligned with longitudinal axis 110 (FIG. 11) and sized and shaped to receive drive member 415, comprising drive member input 516 and drive member output 560, and an indexer 550. In these embodiments, indexer 550 comprises a first collar 550*a* and a second collar 550*b*. A biasing element, illustratively a spring 558 is positioned within indexer 550.

Drive member input 516 comprises an opening 518, which may be the same, or similar to, the central opening 418 of drive member input 416 as described with reference to electro-mechanical lock core 400, to receive clutch 130 when clutch 130 is in the engaged position. Drive member input 516 additionally comprises at least two tabs 522, each comprising an opening 523 extending along an axis generally transverse to longitudinal axis 110 (FIG. 11). Openings 523 are configured for receiving at least two rods 520 configured for operatively coupling drive member input 516 with drive member output 560. Specifically, drive member output 560 may comprise at least two notches 566 on opposing sides of drive member output 560 configured for receiving rods 520 that extend through openings 523 of tabs 522 of drive member input 516, causing rotational coupling of drive member input 516 and drive member output 560, with some relative rotation allowed owing to the length of notches 566.

Figure 18:
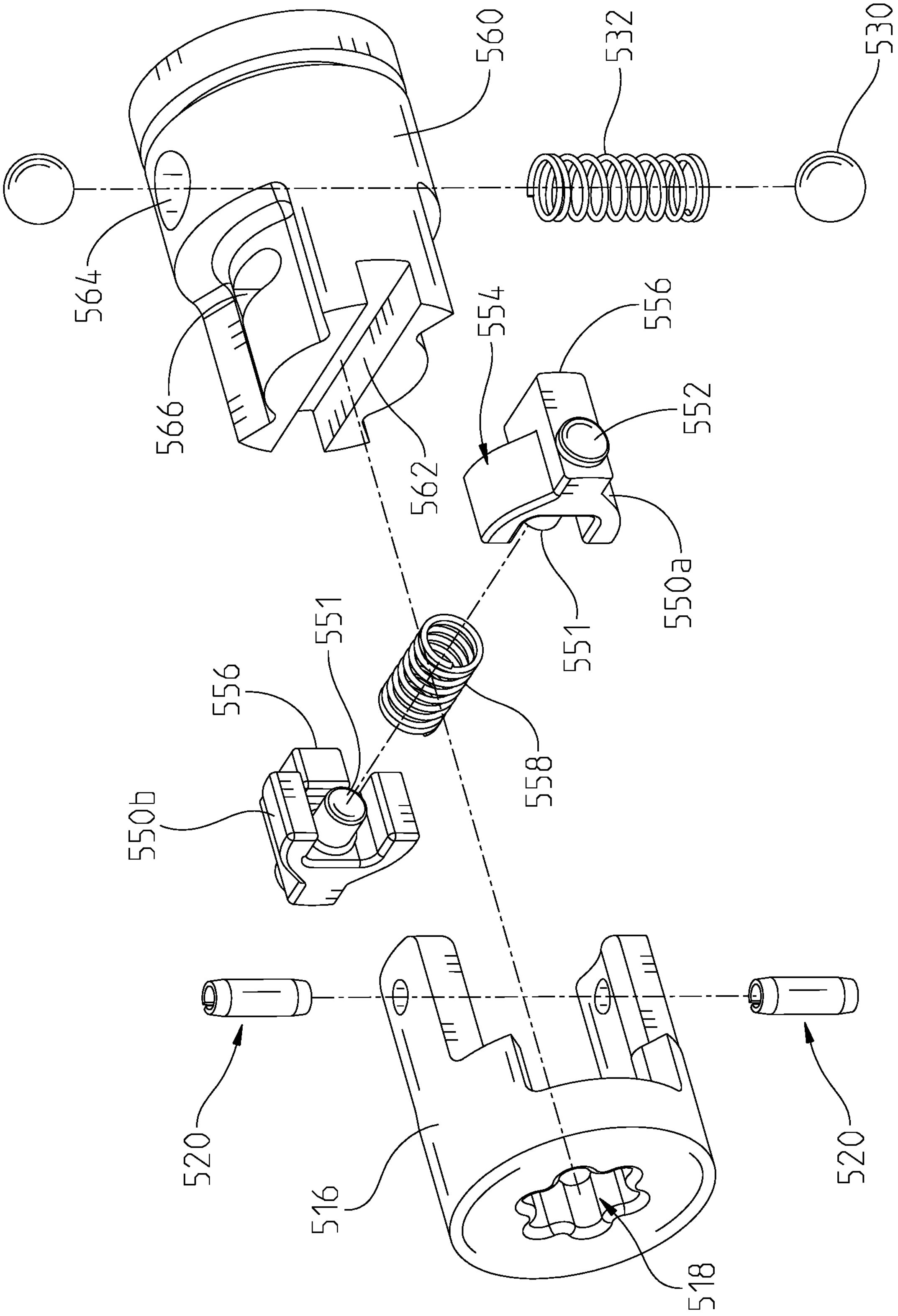
FIG. 18 is an exploded view of a portion of the removeable electro-mechanical lock core of FIG. 15.

With reference to FIGS. 17 and 18, drive member output 560 further comprises opening 564 for receiving a spring 532 and at least two bearings 530. Bearings 530 and spring 532 are the same, or similar to, bearings 430 and spring 432 of electro-mechanical lock core 400. For example, bearings 530 are configured to be in a first home position when received within bearing receivers 408*a*, 408*b* of lock core body 506 and a second home position when received by the third bearing receiver 408*c* and fourth bearing receiver (not shown) of lock core body 506. Drive member output 560 comprises a groove 528 for receiving a retainer, illustratively a C-clip 534, which may be the same as, or similar to the C-clip 434 of electro-mechanical lock core 400 of FIG. 11.

Drive member output 560 comprises a recess 562 aligned generally transverse to longitudinal axis 110 (FIG. 19) for receiving a portion of each of the first and second collars 550*a*, 550*b*. Specifically, recess 562 receives a linear protrusion 556 of each first collar 550*a* and second collar 550*b*. Additionally, first and second collar 550*a*, 550*b* comprise an arcuate portion 554 having an arcuate shape configured for being received by drive member input 516, for example between tabs 522 of drive member input 516.

As illustrated in FIGS. 15-17, core assembly 502 comprises a retainer 540 positioned adjacent a first side of a cam member tailpiece 570 and adjacent drive member output 560. Similar to electro-mechanical lock core 400 of FIG. 11, a plurality of washers 544 and a plurality of bolts 546 are aligned with a second side of cam member tailpiece 570 and extend through a plurality of openings 572 of cam member tailpiece 570 and retainer 540 for securing and operatively coupling lock core body 506 and core assembly 502. As best illustrated in FIG. 20, drive member output 560 comprises slots or openings for threadedly receiving at least a portion of bolts 546 to operably couple drive member output 560, retainer 540 and cam member tailpiece 570, allowing for rotation of cam member tailpiece 570 with rotation of drive member output 560, as will be described further herein.

Figure 19:
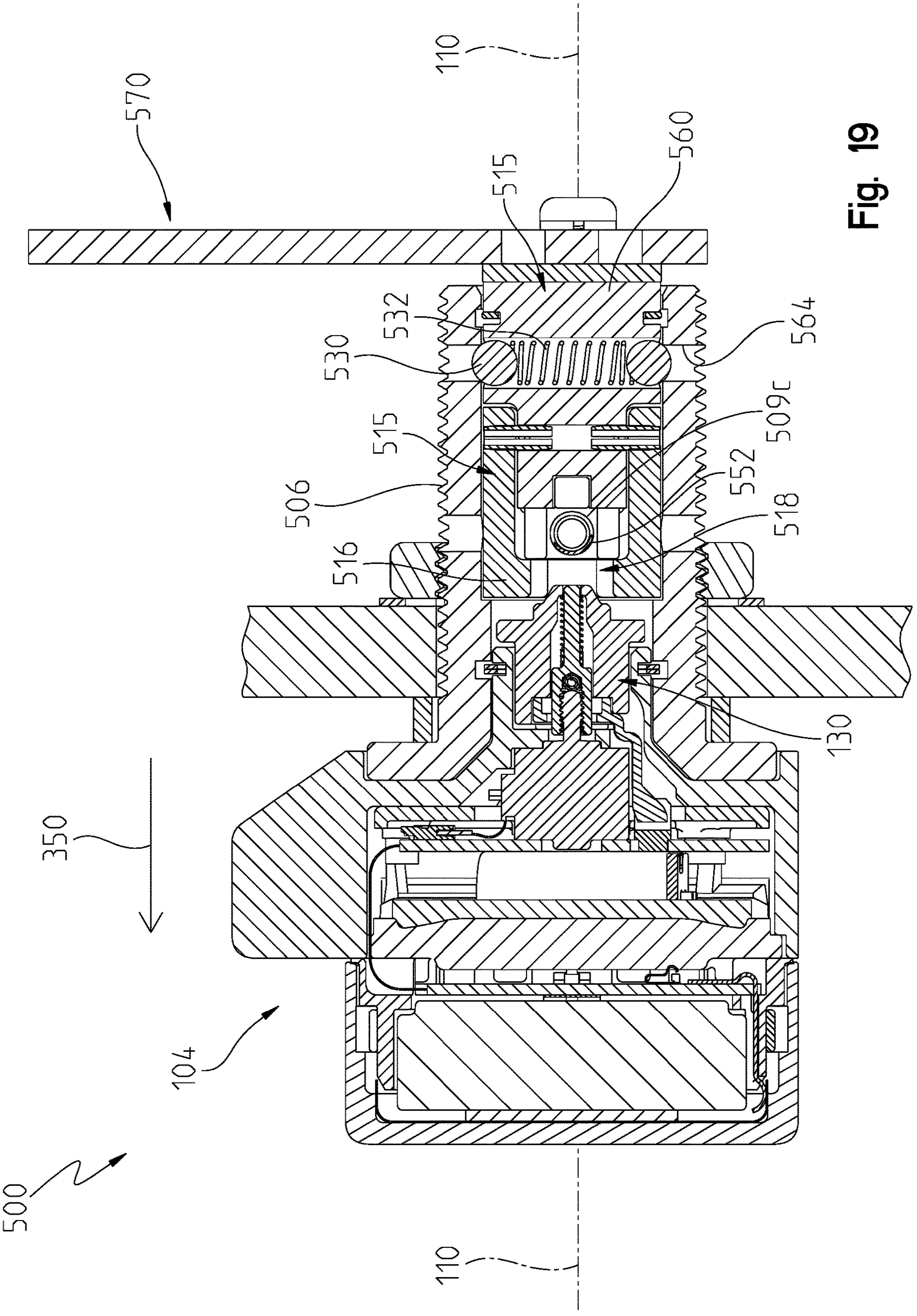
FIG. 19 is a cross-sectional view of the removable electro-mechanical lock core of FIG. 15 taken along line 19-19 of FIG. 15.
Figure 20:
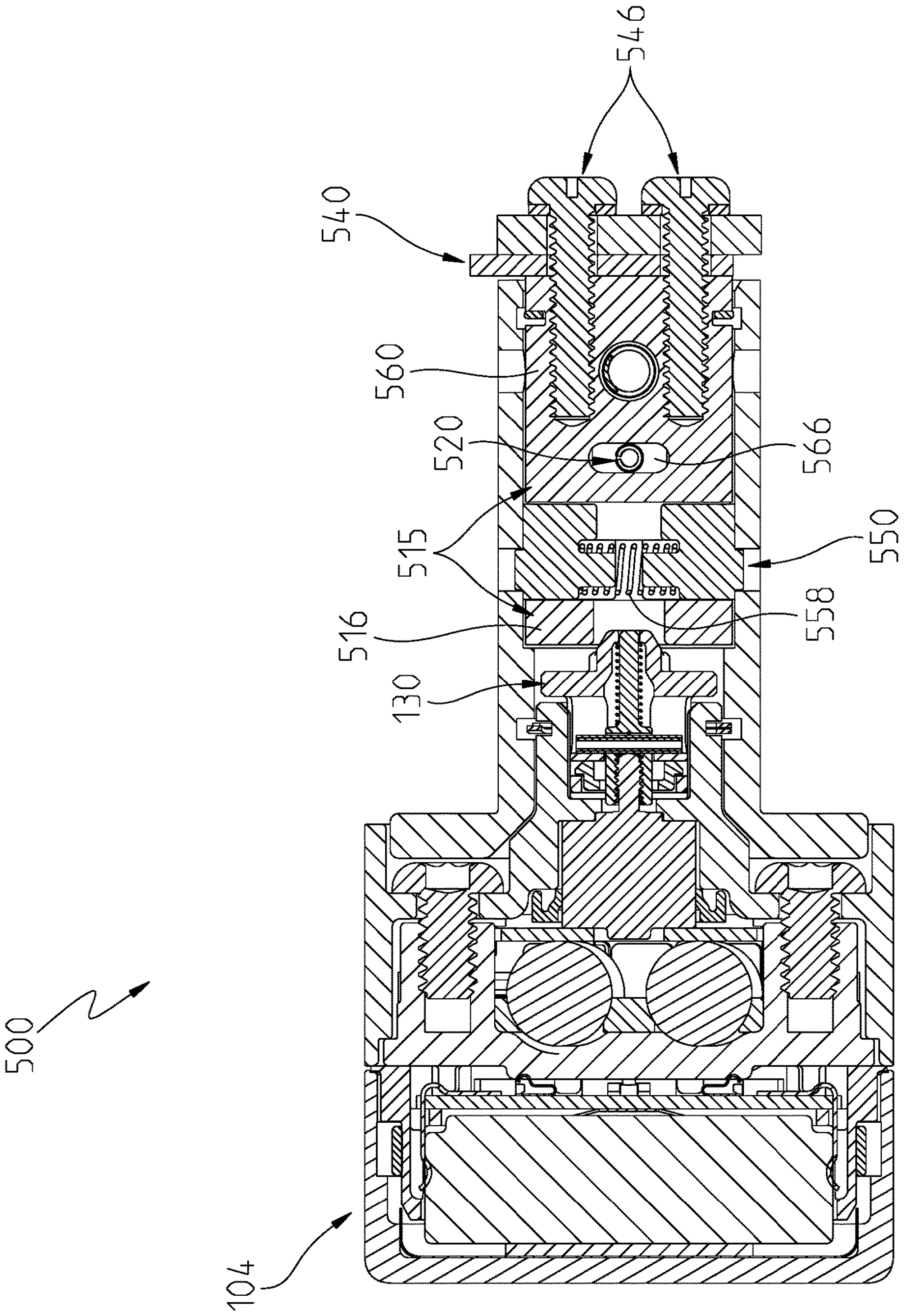
FIG. 20 is a cross-sectional view of the removable electro-mechanical lock core of FIG. 15 taken along line 20-20 of FIG. 15.
Figure 22:
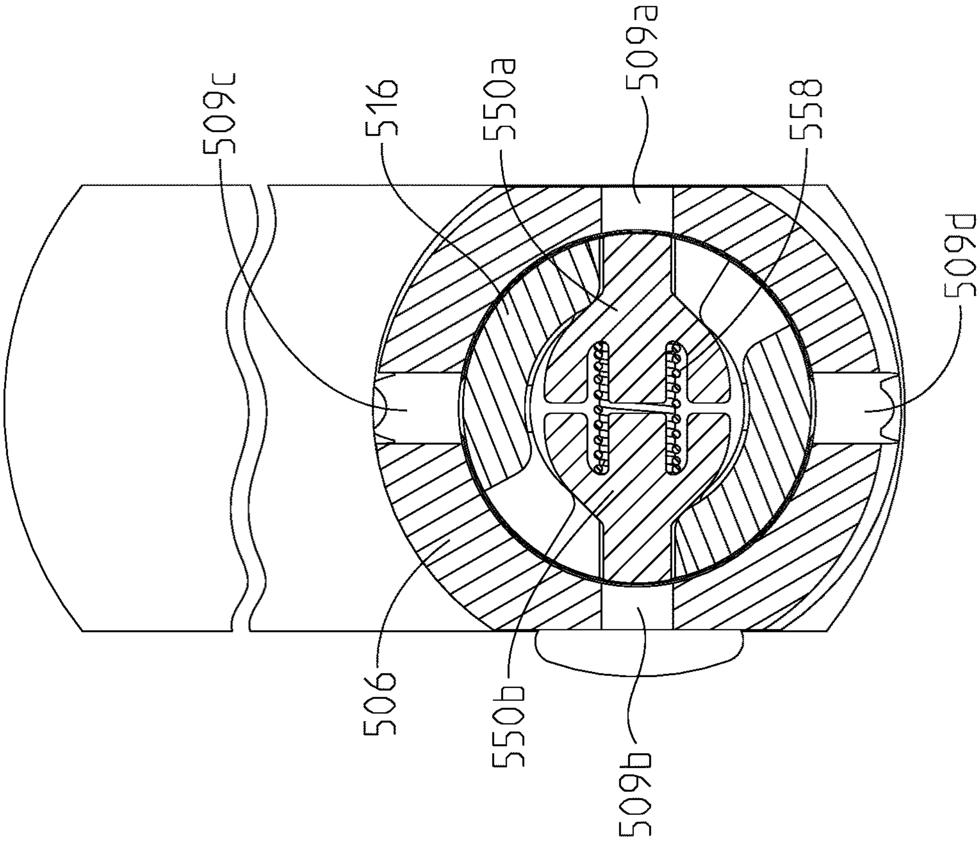
FIG. 22 is an additional cross-sectional view similar to the view of FIG. 21, but showing the removeable electro-mechanical lock core of FIG. 15 after rotation of a drive member and engagement of the drive member with an indexer.
Figure 21:
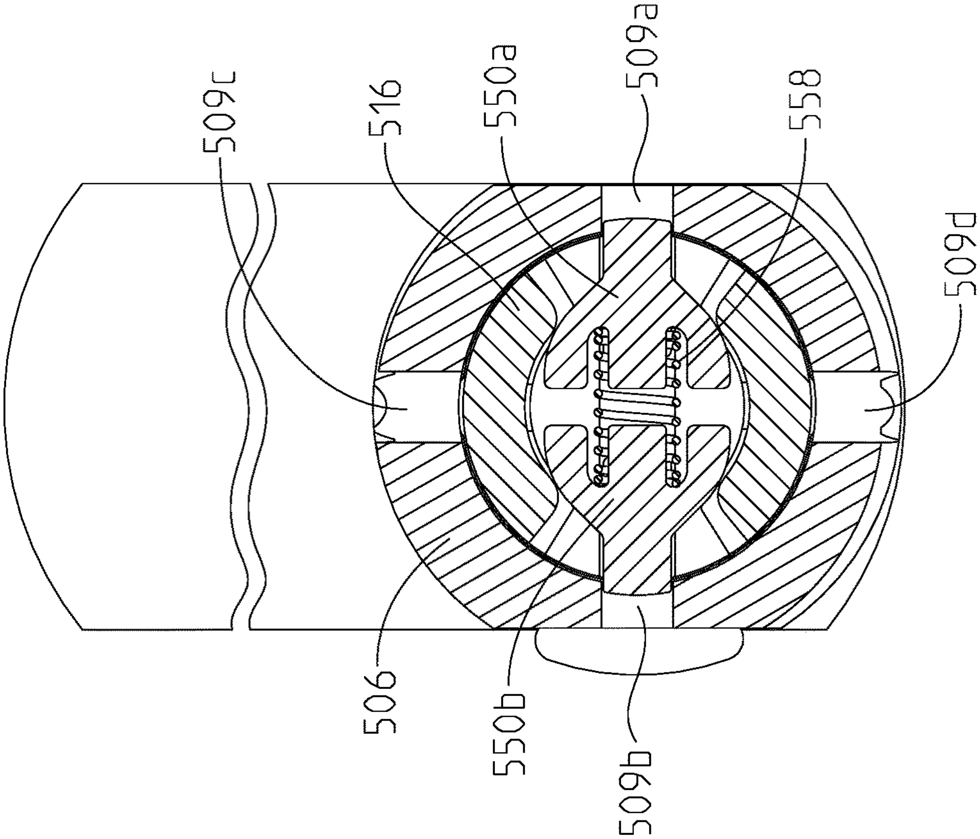
FIG. 21 is a cross-sectional view of the removeable electro-mechanical lock core of FIG. 15 taken along line 21-21 of FIG. 15 showing the removeable electro-mechanical lock core prior to rotation of a drive member.
Figure 23:
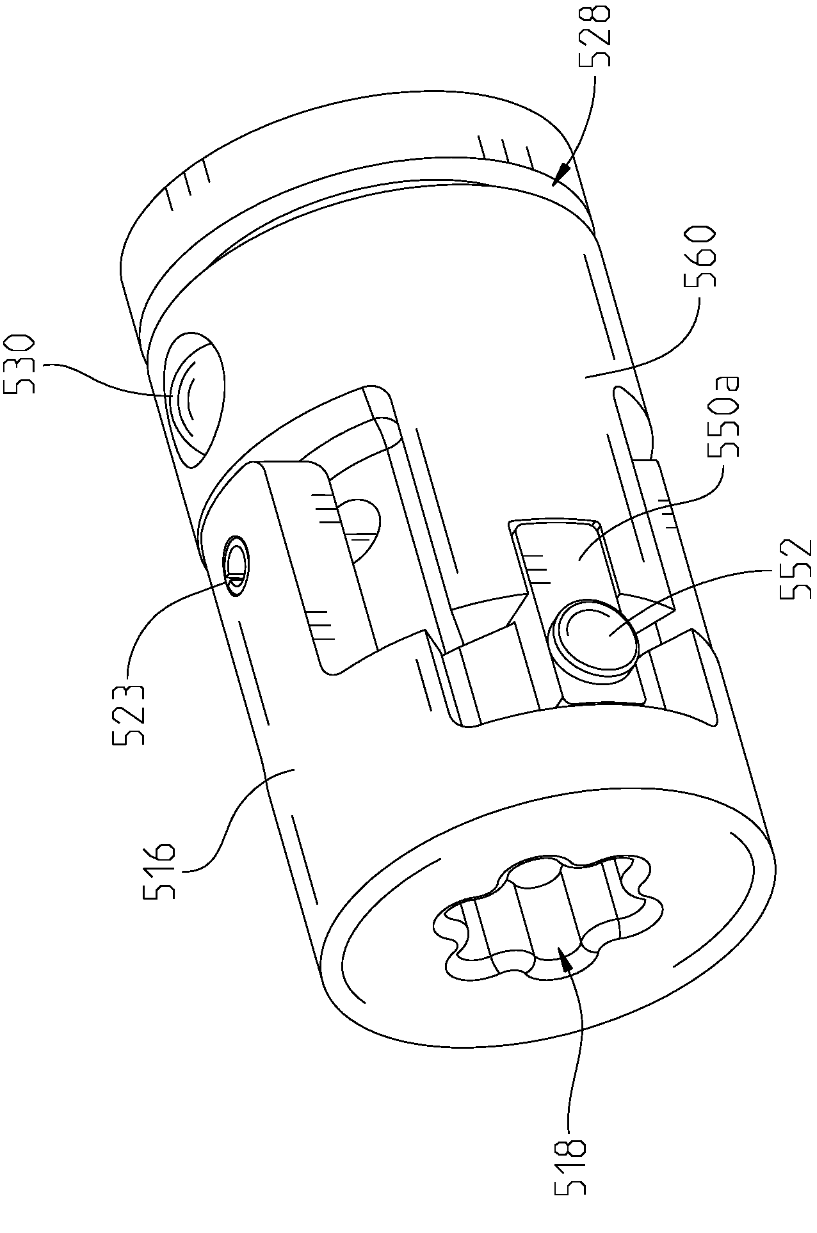
FIG. 23 is a perspective view of a portion of the removeable electro-mechanical lock core of FIG. 15.

The operation of electro-mechanical lock core 500 is described herein with reference to FIGS. 19-23. When clutch 130 is in the second and engaged position with drive member input 516, for example when clutch 130 is in operative engagement with drive member input 516, rotation of operator actuation input 112 allows for rotation of clutch 130 and drive member input 516. In various embodiments, operator actuation input 112 may be rotated clockwise and/or counterclockwise. As such, rotation of drive member 515 may be in a clockwise and/or counterclockwise direction. As illustrated in FIGS. 19 and 20, protrusions 552 of first and second collars 550*a*, 550*b* extend at least partially outward into first and second openings 509*a*, 509*b*, respectively, defining a first position of indexer 550. Additionally, bearings 530 extend outward in the first home position. As shown best in FIGS. 21 and 22, rotation of drive member input 516 causes arcuate surfaces 517 of drive member input 516 to rotate until engaging arcuate portions 554 of first and second collars 550*a*, 550*b*. The force of arcuate portions of drive member input 516 pushing against arcuate portions of first and second collars 550*a*, 550*b* pushes first and second collar 550*a*, 550*b* inwards towards longitudinal axis 110 (FIG. 19). The rotation compresses a biasing element, illustratively spring 558 positioned over posts 551 of first and second collars 550*a*, 550*b*, until protrusions 552 are no longer extending into first and second openings 509*a*, 509*b*, defining full engagement between indexer 550 and drive member input 516. Full engagement may occur after a definite angle of rotation of operator actuation input 112. In various embodiments, this definite angle of rotation may range from 1 to 5 degrees. As drive member input 516 (and thus indexer 550) further continues to rotate through an angle of rotation that exceeds the definite angle of rotation, protrusions 552 may extend into a third opening 509*c* and a fourth opening 509*d* of lock core body 506, defining a second position of indexer 550.

As drive member input 516 rotates, rods 520 rotate within the notches 566 of drive member output 560, ultimately causing engagement with a side surface of each notch 566. As a result of rods 520 being rotated from a relative center of each notch 566 to an end of each notch 566 before rotation of drive member output 560 occurs, an angle of rotation is required by operator actuation input 112 before rotation of drive member output 560. In various embodiments, this degree of rotation ranges from 1 to 5 degrees. In some embodiments, this is the same angle of rotation as the definite angle of rotation required for full engagement between drive member input 516 and indexer 550. In this way, drive member input 516 is rotatable relative to drive member output 560 for a defined angle of rotation before continued rotation of drive member input 516 causes rotation of drive member output 560. Continued rotation may refer to an angle of rotation that exceeds the defined angle of rotation. Similar to the embodiment as described with reference to FIGS. 11-14, rotation of drive member output 560 forces bearings 430 inward, compressing spring 532, and pushing bearings 530 into a retracted position (i.e., a position wherein bearings no longer extend partially outward into bearing receivers 408*a*, 408*b*). During the continued rotation of operator actuation input 112 and thus drive member output 560, bearings 530 may rotate until extending in third bearing receiver 408*c* and fourth bearing receivers (not shown). As drive member output 560 and indexer 550 are rotated, cam member tailpiece 570 is rotated to the second cam member tailpiece position, wherein an end portion of cam member tailpiece 570 may be unaligned with catch 340 (FIG. 9) allowing movement of the electro-mechanical lock core 400 and thus the door or barrier to which it is coupled, in the general direction 350 (FIG. 19). The second cam member tailpiece position of the cam member tailpiece 570 may be in a direction that is counter-clockwise and/or clockwise relative to the first cam member tailpiece position, such that rotation of operator actuation input 112 may be in a counterclockwise and/or clockwise direction to unlock the barrier.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A cam lock for use with a catch, the cam lock comprising:

a lock body;

a drive member supported by the lock body and rotatable relative to the lock body about a longitudinal axis;

a cam member tailpiece coupled to the drive member and rotatable by the drive member, the cam member tailpiece having a first end coupled to the drive member and a second end opposite the first end, the first end being positionable by the drive member in a first cam member tailpiece position adapted to be in line with the catch and a second cam member tailpiece position adapted to be unaligned with the catch;

an electro-mechanical drive assembly including a clutch moveable between a first clutch position, wherein the clutch is operatively disengaged from the drive member, and a second clutch position, wherein the clutch is operatively engaged to the drive member; and an indexer which assists in holding the cam member tailpiece in the first cam member tailpiece position when the clutch is in the first clutch position;

wherein the drive member comprises a drive member input operatively coupled to a drive member output, wherein the drive member input is rotatable relative to the drive member output through a defined angle of rotation; and wherein the indexer comprises a first collar and a second collar operatively coupled to the first collar, wherein each of the first collar and the second collar comprises a protrusion capable of extending into a respective one of a plurality of openings of the lock body.

2. The cam lock of claim 1, wherein the indexer further assists in holding the cam member tailpiece in the second cam member tailpiece position.

3. The cam lock of claim 1, wherein the indexer is positioned within an interior of the lock body.

4. The cam lock of claim 1, wherein the drive member comprises a drive member input and a drive member output operatively coupled to the drive member input such that rotation of the drive member input causes rotation of the drive member output.

5. The cam lock of claim 1, wherein the electro-mechanical drive assembly further comprising:

an operator actuatable input moveably coupled to the lock body;

an electric motor operatively coupled to the clutch to position the clutch in the first clutch position; and a power source operatively coupled to the electric motor.

6. The cam lock of claim 5, wherein the electric motor is operatively coupled to the clutch to position the clutch in the second clutch position wherein the clutch is operatively engaged to the drive member.

7. The cam lock of claim 5, wherein the operator actuatable input is freely rotatable about the longitudinal axis relative to the drive member when the clutch is in the first position and is rotatable about the longitudinal axis only through a defined angular range when the clutch is in the second position, a first end of the defined angular range corresponding to the cam member tailpiece being in the first cam member tailpiece position relative to the lock body and a second end of the defined angular range corresponding to the cam member tailpiece being in the second cam member tailpiece position relative to the lock body.

8. The cam lock of claim 1, wherein the second end of the cam member tailpiece is positioned outside of an exterior envelope of the lock body in both the first cam member tailpiece position and the second cam member tailpiece position.

9. An electro-mechanical lock core, comprising:

a lock core body having a longitudinal axis;

a drive member supported by the lock core body and moveable relative to the lock core body;

a cam member tailpiece operatively coupled to the drive member and rotatable by the drive member, the cam member tailpiece being positionable by the drive member in a first cam member tailpiece position longitudinally in line with a catch and in a second cam member tailpiece position wherein the cam member tailpiece is longitudinally unaligned with the catch;

an indexer operatively coupled to the drive member such that rotation of the drive member causes rotation of the indexer;

wherein the indexer comprises a first collar and a second collar, each comprising a protrusion biased into a first position, wherein the protrusions are extendable into a plurality of openings of the lock core body; and an electro-mechanical drive assembly including a clutch moveable between a first clutch position, wherein the clutch is operatively disengaged from the drive member, and a second clutch position, wherein the clutch is operatively engaged to the drive member.

10. The electro-mechanical lock core of claim 9, wherein the drive member comprises a drive member input operatively coupled to a drive member output, the drive member input being rotatable relative to the drive member output through a defined angular range.

11. The electro-mechanical lock core of claim 10, wherein rotation of the drive member input at an angle that exceeds the defined angular range causes rotation of the drive member output.

12. The electro-mechanical lock core of claim 11, wherein rotation of the drive member output causes the protrusions of the first and second collars to be rotated out of the first position, retracted from the plurality of openings, and rotated into a second position.

13. The electro-mechanical lock core of claim 12, wherein the drive member comprises a plurality of bearings biased in a first positioned wherein the plurality of bearings extend into a plurality of openings of the lock core body to retain the cam member tailpiece in the first cam member position.

14. The electro-mechanical lock core of claim 13, wherein the rotation of the drive member output causes the rotation of the plurality of bearings from the first position to retain the cam member tailpiece in the first cam member position to a second position to retain the cam member tailpiece in the second cam member position.

15. A method of unlocking a barrier, the method comprising the steps of:

holding a cam member tailpiece of a removeable lock core in a first cam member tailpiece position, wherein a portion of the cam member tailpiece is aligned with a catch of the barrier;

providing an operator actuatable assembly supported by the removeable lock core, a clutch of operator assembly operatively coupled with the cam member tailpiece through a drive member, an indexer operatively coupled to the drive member such that rotation of the drive member causes rotation of the indexer, wherein the indexer comprises a first collar and a second collar, each comprising a protrusion capable of extending into a respective one of a plurality of openings of the lock core, the clutch having an engaged state, wherein an operator actuatable input is operatively coupled with the drive member, and a disengaged state, wherein the operator actuatable input is not operatively coupled with the drive member, wherein rotation of the operator actuatable input when the clutch is in the engaged state causes rotation of the drive member from a first position of the drive member to a second position of the drive member, each of the first position of the drive member and the second position of the drive member defined by an orientation of a plurality of bearings, and wherein rotation of the drive member from the first position of the drive member to the second position of the drive member causes rotation of the cam member tailpiece from the first cam member tailpiece position to a second cam member tailpiece position, wherein the portion of the cam member tailpiece is no longer aligned with the catch of the barrier;

communicating credential information between an electronic controller of the removable lock core and a portable user device to move the clutch to the engaged state; and rotating the operator actuatable input.

16. The method of claim 15, wherein when the clutch is in the engaged state, the rotation of the operator actuatable input is limited to an angular range for rotation that is defined by the rotation of the drive member from the first position of the drive member to the second position of the drive member.

* * * * *